(12) United States Patent
Saito

(10) Patent No.: US 6,594,121 B1
(45) Date of Patent: Jul. 15, 2003

(54) THIN-FILM MAGNETIC HEAD PROVIDED WITH MAGNETORESISTIVE THIN-FILM ELEMENT

(75) Inventor: Masamichi Saito, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/490,562

(22) Filed: Jan. 25, 2000

(30) Foreign Application Priority Data

Jan. 27, 1999 (JP) .......................................... 11-019116

(51) Int. Cl.[7] ................................................ G11B 5/39
(52) U.S. Cl. .............. 360/314; 360/324.11; 360/324.12
(58) Field of Search ....................... 360/327.32, 324.12, 360/207.21, 314, 324.11

(56) References Cited

U.S. PATENT DOCUMENTS

| | | | |
|---|---|---|---|
| 5,159,513 A | | 10/1992 | Dieny et al. |
| 5,287,238 A | * | 2/1994 | Baumgart et al. ..... 324/207.21 |
| 5,373,238 A | | 12/1994 | McGuire et al. |
| 5,701,223 A | * | 12/1997 | Fontana et al. ........ 360/324.11 |
| 5,768,067 A | | 6/1998 | Saito et al. |
| 5,784,225 A | | 7/1998 | Saito et al. |
| 5,828,529 A | * | 10/1998 | Gill ....................... 360/324.11 |
| 6,295,186 B1 | * | 9/2001 | Hasegawa et al. ..... 360/324.11 |

FOREIGN PATENT DOCUMENTS

| | | | | |
|---|---|---|---|---|
| EP | 694788 A2 | * | 1/1996 | ........... G01R/33/09 |
| JP | 09035212 A | * | 2/1997 | ........... G11B/5/39 |
| JP | 10-91921 | | 4/1998 | |
| JP | 10116403 A | * | 5/1998 | ........... G11B/5/39 |

* cited by examiner

Primary Examiner—William Klimowicz
(74) Attorney, Agent, or Firm—Brinks Hofer Gilson & Lione

(57) ABSTRACT

A thin-film magnetic head provided with a magnetoresistive thin-film element includes a laminate including an antiferromagnetic layer, a pinned magnetic layer, a nonmagnetic conductive layer, and a free magnetic layer. At both sides of the laminate, soft magnetic layers, secondary antiferromagnetic layers, and conductive layers are formed. The antiferromagnetic layer generates a unidirectional exchange coupling by heat treatment to fix the magnetization of the pinned magnetic layer, and the secondary antiferromagnetic layers generate a unidirectional exchange coupling as deposited without heat treatment.

6 Claims, 14 Drawing Sheets

THIN-FILM MAGNETIC HEAD PROVIDED WITH MAGNETORESISTIVE THIN-FILM ELEMENT

BACKGROUND OF THE INVENTION

1. Field of the Invention

The present invention relates to thin-film magnetic heads provided with magnetoresistive thin-film elements in which the resistance changes greatly in response to changes in external magnetic fields, and more particularly, to a technique using a structure in which a longitudinal bias magnetic field is satisfactorily applied to a free magnetic layer.

2. Description of the Related Art

A giant magnetoresistive (GMR) head utilizing an element having a giant magnetoresistive effect (GMR effect) has been known as a magnetoresistive read head for reading magnetic data from a magnetic recording medium such as a hard disk. A spin-valve type head has been known as a GMR head having a relatively simple structure and a high rate of resistance change in relation to an external magnetic field.

FIG. 20 is a sectional view of an example of a structure of such a spin-valve type GMR thin-film element.

The structure shown in FIG. 20 includes a laminate 207, that is trapezoidal in section, in which an underlying layer 201, a free magnetic layer 202, a nonmagnetic conductive layer 203, a pinned magnetic layer 204, an antiferromagnetic layer 205, and a protective layer 206 are deposited on a substrate in that order. Hard bias layers 208 and conductive layers 209 are formed so as to cover the inclined sides of the laminate 207.

In the structure shown in FIG. 20, the pinned magnetic layer 204 has a higher coercive force than that of the free magnetic layer 202, and the pinned magnetic layer 204 is aligned in a single-domain state in the Y direction in FIG. 20 by an exchange anisotropic magnetic field caused by the antiferromagnetic layer 205 deposited directly on the pinned magnetic layer 204, and the magnetization direction is fixed in the Y direction.

The hard bias layers 208 are magnetized in the X1 direction in FIG. 20, and since the free magnetic layer 202 adjacent to the hard bias layers 208 is aligned in a single-domain state in the X1 direction by the hard bias layers 208, Barkhausen noise, which is generated by the formation of many magnetic domains in the free magnetic layer 202, is prevented from occurring.

In this structure, a sensing current is applied from the conductive layer 209 to the free magnetic layer 202, the nonmagnetic conductive layer 203, and the pinned magnetic layer 204. The driving direction of a magnetic recording medium such as a hard disk is set in the Z direction in FIG. 20, and when a fringing magnetic field from the recording medium is applied in the Y direction, the magnetization of the free magnetic layer 202 changes from the X1 direction to the Y direction. Because of the relationship between the change in the magnetization direction in the free magnetic layer 202 and the fixed magnetization direction of the pinned magnetic layer 204, the electrical resistance changes, and the fringing magnetic field from the recording medium is detected by a voltage change based on the change in the electrical resistance.

FIG. 21 shows an example of another structure of a spin-valve type element, in which a bias is applied in a manner different from that in the structure shown in FIG. 20. The structure shown in FIG. 21 includes a laminate 217 in which an underlying layer 211 composed of Ta, a free magnetic layer 212 composed of an NiFe alloy, a nonmagnetic conductive layer 213 composed of Cu, a pinned magnetic layer 214 composed of an NiFe alloy, an antiferromagnetic layer 215 composed of an FeMn alloy, and a protective layer 216 composed of an insulating material are deposited on a substrate 210 in that order. On both sides of the laminate 217, ferromagnetic layers 218 composed of an NiFe alloy, antiferromagnetic layers 219 composed of an NiMn alloy, and conductive layers 220 composed of Cu are deposited.

In the structure shown in FIG. 21, the pinned magnetic layer 214 is aligned in a single-domain state in the direction represented by an arrow 222 (in the Y direction) by an exchange anisotropic magnetic field caused by the antiferromagnetic layer 215 deposited on the pinned magnetic layer 214, and the magnetization direction is fixed in the Y direction. The antiferromagnetic layer 219 composed of the NiMn alloy is not antiferromagnetic at room temperature. However, when heated, the antiferromagnetic layer 219 becomes antiferromagnetic, and by applying a magnetic field in the direction represented by an arrow 221 (in the X1 direction) in FIG. 21 during heat treatment, the magnetization is aligned along the direction of the applied magnetic field. After the heat treatment, the magnetization of the antiferromagnetic layer 219 is fixed, generating an antiferromagnetic coupling with the ferromagnetic layer 218, and the free magnetic layer 212 can be aligned in a single-domain state in the magnetization direction of the ferromagnetic layer 218 also in the structure shown in FIG. 21. Thus, the magnetoresistive effect can be obtained without causing Barkhausen noise.

With respect to the structure shown in FIG. 20, in which the free magnetic layer 202 is aligned in a single-domain state by the hard bias layers 208, ends of the free magnetic layer 202 tend to become insensitive zones in which the magnetization direction does not easily change under the influence of the magnetization direction of the hard bias layers 208, resulting in a hindrance to the narrowing of tracks associated with the improvement in the recording density of magnetic recording media.

Therefore, in view of the narrowing of tracks, the biasing method shown in FIG. 21, in which no hard bias layer is used, could be effective. However, the application of a bias in the structure shown in FIG. 21 gives rise to the following problems.

In the structure shown in FIG. 21, the antiferromagnetic layer 215 pins the magnetization direction of the pinned magnetic layer 214, and the antiferromagnetic layer 219 aligns the free magnetic layer 212 in a single-domain state for biasing. The magnetization directions caused by the antiferromagnetic layer 215 and the antiferromagnetic layer 219 differ by 90°.

Although the magnetization directions of the antiferromagnetic layers 215 and 219 are usually controlled by deposition in a magnetic field or magnetic annealing after deposition, it is very difficult to align the magnetization of the antiferromagnetic layer 219, which is formed later, in a direction different from that of the magnetization of the antiferromagnetic layer 215, which is formed first, without disturbing the magnetization direction of the antiferromagnetic layer 215.

As described in the specification of Japanese Unexamined Patent Publication No. 8-45032 (Japanese Patent Application No. 7-122104) which discloses the structure shown in FIG. 21, the aforementioned problem can be avoided by a method in which, using a magnetic film of an FeMn alloy and a magnetic film of an NiMn alloy having different Néel temperatures, the magnetic film having a higher Néel temperature is firstly subjected to high-temperature heat treatment for aligning the magnetic field, and secondly the magnetic film having a lower Néel temperature is subjected to low-temperature heat treatment for aligning the magnetic field in the direction different from that in the first heat treatment by 90°. However, since the FeMn alloy constituting an antiferromagnetic layer has a low Néel temperature and has a low blocking temperature at which antiferromagnetism is believed to disappear, a bias magnetic field caused by the antiferromagnetic layer made of the FeMn alloy easily becomes unstable due to heat generated when a magnetic recording device such as a hard disk drive is operated.

Furthermore, in the structure disclosed in Japanese Unexamined Patent Publication No. 8-45032, an NiMn alloy film having a high Néel temperature which requires heat treatment is used for applying a longitudinal bias, and an FeMn alloy film having a low Néel temperature is used for pinning the magnetization of a pinned magnetic layer. However, since the NiMn alloy film for applying the longitudinal bias is usually deposited after an antiferromagnetic layer and the pinned magnetic layer are deposited, the heat treatment of the NiMn alloy film is performed subsequently to the deposition or the heat treatment of the antiferromagnetic layer and the pinned magnetic layer, and thus the characteristics of the spin-valve film comprising the antiferromagnetic layer and the pinned magnetic layer may be adversely affected by the heat treatment of the NiMn alloy film.

SUMMARY OF THE INVENTION

Accordingly, it is an object of the present invention to provide a thin-film magnetic head provided with a magnetoresistive thin-film element in which a structure for applying a longitudinal bias magnetic field to align a free magnetic layer in a single-domain state is employed, the longitudinal bias magnetic field can be applied satisfactorily, the structure is easy to fabricate, and stable characteristics are obtainable, as well as to provide a method of producing the same.

In accordance with the present invention, a thin-film magnetic head provided with a magnetoresistive thin-film element, as an element for reading magnetic data, includes a laminate including an antiferromagnetic layer, a pinned magnetic layer formed in contact with the antiferromagnetic layer, the magnetization direction of the pinned magnetic layer being fixed in a predetermined direction by an exchange coupling magnetic field caused by the antiferromagnetic layer, and a free magnetic layer formed on the pinned magnetic layer with a nonmagnetic conductive layer therebetween, the magnetization of the free magnetic layer being aligned in the direction perpendicular to the magnetization direction of the pinned magnetic layer. Soft magnetic layer is formed at both sides of the laminate. Secondary antiferromagnetic layer formed in contact with the soft magnetic layers for generating a unidirectional exchange coupling in the soft magnetic layers and applying a bias magnetic field to the free magnetic layer, and conductive layers are formed. The antiferromagnetic layer generates a unidirectional exchange coupling by heat treatment to fix the magnetization of the pinned magnetic layer, and the secondary antiferromagnetic layers generate the unidirectional exchange coupling as deposited without heat treatment.

In accordance with the present invention, the magnetoresistive thin-film element may have a dual-type structure in which the nonmagnetic conductive layer, the pinned magnetic layer, and the antiferromagnetic layer are formed on each side of the free magnetic layer in the depth direction.

In accordance with the present invention, at least one of the pinned magnetic layer and the free magnetic layer may be separated into two layers by a nonmagnetic layer, in which the magnetization directions of the separated layers differ by 180°, resulting in a ferrimagnetic state.

In accordance with the present invention, the antiferromagnetic layer may generate the unidirectional exchange coupling because a disordered structure is transformed into an ordered structure by heat treatment after deposition.

In accordance with the present invention, the antiferromagnetic layer may be composed of one of an X—Mn alloy and a Pt—Mn—X' alloy, where X is an element selected from the group consisting of Pt, Pd, Ir, Rh, and Ru, and X' is at least one element selected from the group consisting of Pd, Ir, Rh, Ru, Au, Ag, Cr, and Ni.

In accordance with the present invention, the secondary antiferromagnetic layer may be composed of an X"—Mn alloy, where X" is at least one element selected from the group consisting of Ru, Rh, Ir, Pd, and Pt.

In accordance with the present invention, an underlying layer composed of a nonmagnetic conductor may be formed between the laminate and the soft magnetic layers.

In accordance with the present invention, a method of producing a thin-film magnetic head provided with a magnetoresistive thin-film element includes the steps of forming a laminate including an antiferromagnetic layer having a disordered structure, a pinned magnetic layer, a nonmagnetic conductive layer, and a free magnetic layer; performing heat treatment on the antiferromagnetic layer to transform the disordered structure into an ordered structure so that the magnetization of the pinned magnetic layer is fixed in a predetermined direction by an exchange coupling magnetic field by the antiferromagnetic layer; and forming soft magnetic layers, secondary antiferromagnetic layers, and conductive layers at both sides of the laminate so that the magnetization of the free magnetic layer is aligned in the direction perpendicular to the magnetization direction of the pinned magnetic layer by a unidirectional exchange coupling of the secondary antiferromagnetic layers through the soft magnetic layers.

In accordance with the production method of the present invention, when the heat treatment is performed, a magnetic field is preferably applied in the height direction (in the direction of the height of the element).

In accordance with the production method of the present invention, heat treatment is preferably performed on the secondary antiferromagnetic layer at a temperature that is lower than the blocking temperature of the secondary antiferromagnetic layer so that the structure of the secondary antiferromagnetic layer is not transformed.

In accordance with the production method of the present invention, the secondary antiferromagnetic layer is preferably deposited while applying a magnetic field in the track width direction.

In accordance with the production method of the present invention, heat treatment may be performed on the secondary antiferromagnetic layer at a temperature that is lower than the blocking temperature of the antiferromagnetic layer and higher than the blocking temperature of the secondary antiferromagnetic layer so that the structure of the secondary antiferromagnetic layer is not transformed.

DESCRIPTION OF THE PREFERRED EMBODIMENTS

First Embodiment

Figure 1:
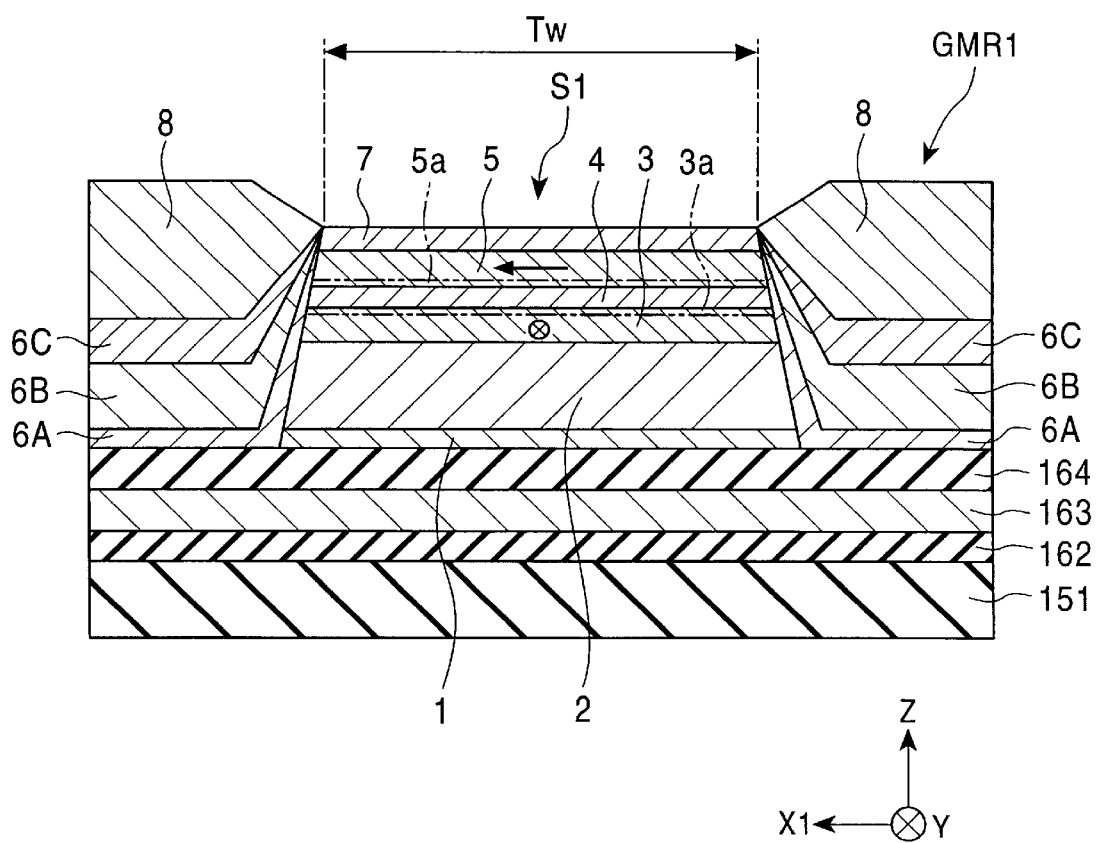
FIG. 1 is a sectional view of a giant magnetoresistive thin-film element provided on a thin-film magnetic head as a first embodiment of the present invention.

FIG. 1 is a sectional view of a giant magnetoresistive thin-film element provided on a thin-film magnetic head as a first embodiment of the present invention.

Figure 2:
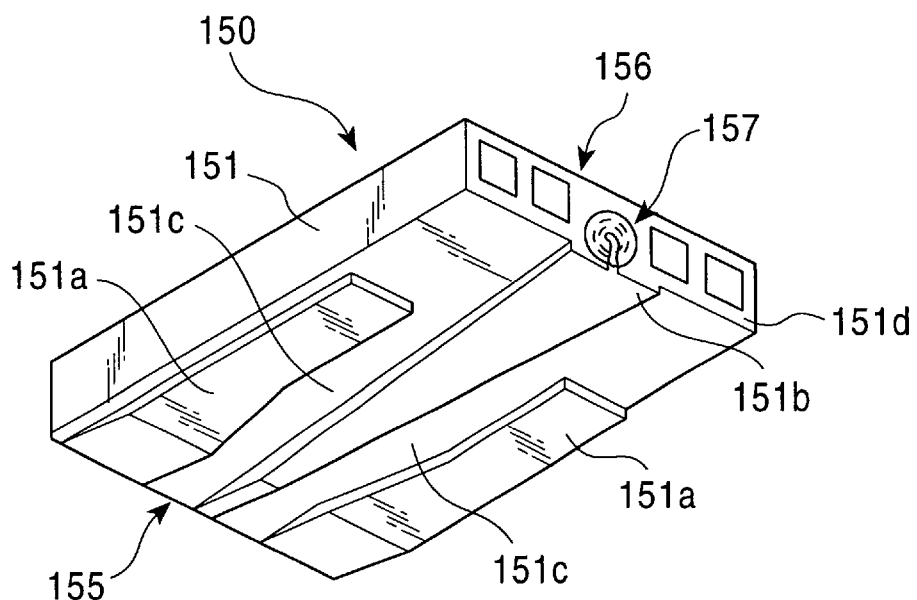
FIG. 2 is a perspective view of a thin-film magnetic head provided with the giant magnetoresistive thin-film element shown in FIG. 1.
Figure 3:
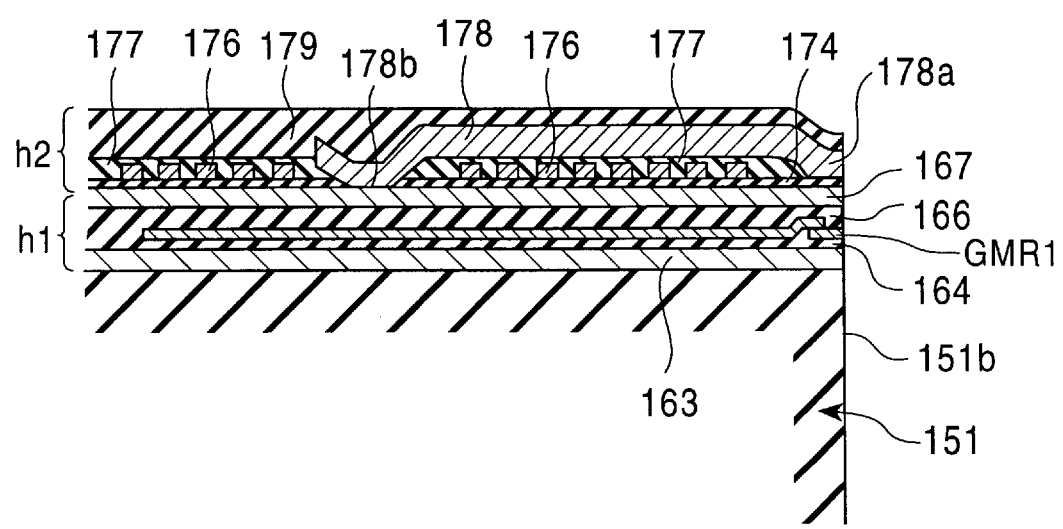
FIG. 3 is a sectional view of the thin-film magnetic head shown in FIG. 2.
Figure 4:
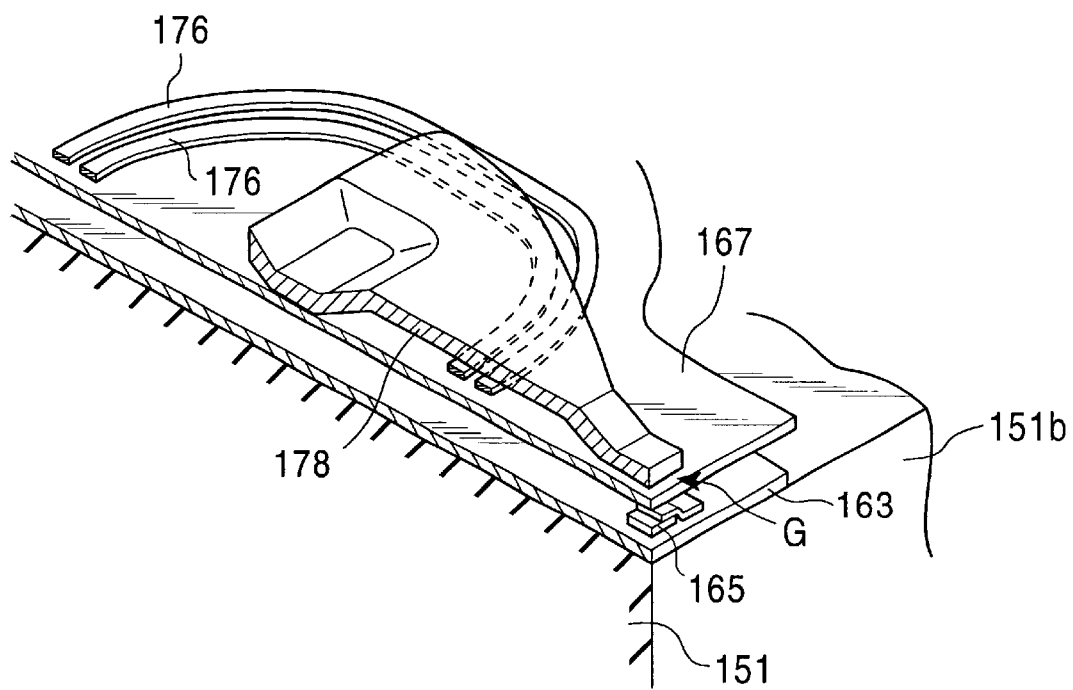
FIG. 4 is a perspective view of a key portion of the thin-film magnetic head shown in FIG. 2.

The structure shown in FIG. 1 is employed, for example, in a floating-type thin-film magnetic head shown in FIGS. 2 to 4. A thin-film magnetic head 150 is mounted in a hard disk drive or the like.

In FIG. 2, numeral 155 represents the leading side of a slider 151 of the thin-film magnetic head 150, and numeral 156 represents the trailing side. On the surface of the slider 151 facing a magnetic disk, rail-shaped air bearing surfaces (ABS) 151a and 151b and air grooves 151c are formed.

A magnetic core section 157 is provided on an end 151d of the slider 151 at the trailing side.

The magnetic core section 157 of the thin-film magnetic head in this embodiment has a combined magnetic core structure, in which a read head (GMR head utilizing a giant magnetoresistive thin-film element) h1 and a write head (inductive head) h2 are deposited at the trailing end 151d of the slider 151.

The GMR head h1 includes a protective layer 162 formed at the trailing end of the slider 151, a lower shielding layer 163 composed of a magnetic alloy formed on the protective layer 162, and a lower gap layer 164 formed thereon. A magnetoresistive thin-film element GMR1 is deposited on the lower gap layer 164. An upper gap layer 166 is formed on the magnetoresistive thin-film element GMR1, and an upper shielding layer 167 is formed thereon. The upper shielding layer 167 also serves as a lower core layer for the inductive head h2 formed thereon.

The inductive head h2 includes a gap layer 174 formed on the lower core layer (upper shielding layer) 167, and a coil 176 which is spirally patterned on the surface of the gap layer 174. The coil 176 is surrounded by an insulating material layer 177. An upper core layer 178 is formed on the insulating material layer 177, and a tip 178a of the upper core layer 178 is opposed to the lower core layer 167 with a small gap therebetween at the ABS 151b. A base 178b of the upper core layer 178 is magnetically coupled with the lower core layer 167.

A protective layer 179 composed of alumina or the like is formed on the upper core layer 178.

In the GMR head h1 having the structure described above, the resistance of the giant magnetoresistive thin-film element GMR1 changes depending on whether a small fringing magnetic field from a magnetic recording medium such as a hard disk is present or not, and by reading the resistance change, data recorded in the magnetic recording medium are read.

In the inductive head h2 having the structure described above, a recording current is applied to the coil 176, and the recording current is applied from the coil 176 to the core layers. Magnetic signals are written in a magnetic recording medium such as a hard disk by means of a fringing magnetic field from the lower core layer 167 and the tip of the upper core layer 178 at a magnetic gap G of the inductive head h2.

Next, the giant magnetoresistive thin-film element GMR1, which is a key element in the present invention, will be described based on FIG. 1.

A magnetic recording medium such as a hard disk moves in the Z direction in FIG. 1, and a fringing magnetic field from the magnetic recording medium is directed in the Y direction in FIG. 1.

In the structure shown in FIG. 1, the protective layer 162 composed of an insulator such as alumina ($Al_2O_3$) is formed on the slider 151 composed of a hard insulating material, for example, a ceramic such as $Al_2O_3$—TiC (ALTiC). The lower shielding layer 163 is formed on the protective layer 162, and the lower gap layer 164 composed of an insulator such as alumina ($Al_2O_3$) is formed on the lower shielding layer 163. The magnetoresistive thin-film element GMR1 is formed on the lower gap layer 164.

The magnetoresistive thin-film element GMR1 has a so-called "bottom-type single spin-valve structure", and includes a laminate S1, that is isosceles trapezoidal in section, in which an underlying layer 1, an antiferromagnetic layer 2, a pinned magnetic layer 3, a nonmagnetic conductive layer 4, a free magnetic layer 5, and a protective layer 7 are deposited on the lower gap layer 164 in that order. On each of the inclined sides of the laminate S1, an underlying layer 6A, a soft magnetic layer 6B, a secondary antiferromagnetic layer 6C, and a conductive layer 8 are deposited. Since the secondary antiferromagnetic layer 6C imparts unidirectional anisotropy to the soft magnetic layer 6B in the X1 direction (track width Tw direction) in FIG. 1, the magnetization of the free, magnetic layer 5 is aligned in a single-domain state in the X1 direction as shown by the arrow in FIG. 1 through the soft magnetic layer 6B, and thus a longitudinal bias magnetic field is applied to the free magnetic layer 5.

The pinned magnetic layer 3 is formed in contact with the antiferromagnetic layer 2, and by magnetic annealing (heat treatment), a unidirectional exchange coupling occurs at the interface between the pinned magnetic layer 3 and the antiferromagnetic layer 2, resulting in an exchange coupling magnetic field (exchange anisotropic magnetic field). The magnetization of the pinned magnetic layer 3 is fixed, for example, in the Y direction as shown in FIG. 1.

In the laminated structure described above, for example, the underlying layer 1 is composed of a nonmagnetic material such as Ta, the pinned magnetic layer 3 is composed of a Co film, an NiFe alloy film, a CoNiFe alloy film, a CoFe alloy film, or the like, the free magnetic layer 5 is composed of an NiFe alloy film, the nonmagnetic conductive layer 4 is composed of a nonmagnetic conductive film such as Cu, and the protective layer 7 is composed of a nonmagnetic film such as Ta.

In the present invention, the antiferromagnetic layer 2 is preferably composed of a PtMn alloy. The PtMn alloy has higher corrosion resistance in comparison with an NiMn alloy or an FeMn alloy, which has been conventionally used as an antiferromagnetic layer, and also has a high blocking temperature (380° C.) and a large exchange coupling magnetic field (exchange anisotropic magnetic field).

In the present invention, instead of the PtMn alloy, the antiferromagnetic layer 2 may be composed of an X—Mn alloy, where X is at least one element selected from the group consisting of Pd, Ir, Rh, and Ru, or a Pt—Mn—X' alloy, where X' is at least one element selected from the group consisting of Pd, Ir, Rh, Ru, Au, and Ag. The antiferromagnetic layer 2 pins and aligns the magnetization direction of the adjacent pinned magnetic layer 3 in the Y direction in FIG. 1 by the exchange coupling magnetic field caused by unidirectional exchange coupling.

In the binary X—Mn alloy, the content of the element X is preferably set in a range from 37 to 63 atomic %, and more preferably, in a range from 44 to 57 atomic-%. In the ternary Pt—Mn—X' alloy, the Pt content is preferably set in a range from 37 to 63 atomic %, and the content of the element X' is preferably set in a range from 0.2 to 10 atomic %. With respect to the ternary Pt—Mn—X' alloy, the content of Pt+X' is more preferably set in a range from 44 to 57 atomic %.

By using an alloy in the proper compositional range and transforming the disordered structure when deposited into the ordered structure by heat treatment (annealing), an antiferromagnetic layer 2 generating a large exchange coupling magnetic field can be obtained. In particular, by using a Pt—Mn alloy, an excellent antiferromagnetic layer 2 having an exchange coupling magnetic field exceeding 800 Oe and a high blocking temperature of 380° C., at which the exchange coupling magnetic field disappears, can be obtained.

Although these alloys as deposited have disordered face-centered cubic structures (fcc, in which axes a and c have the same lattice constant), the structures are transformed into CuAu—I type ordered face-centered cubic structures (fct: axis a/axis c≈0.9) by heat treatment.

The underlying layer 6A is preferably composed of a nonmagnetic conductive layer such as Ta. The underlying layer 6A is formed for adjusting the film quality of the soft magnetic layer 6B formed on the underlying layer 6A, and although the underlying layer 6A is provided in this embodiment, it may be omitted.

The soft magnetic layer 6B is composed of an NiFe alloy, Co, a Co alloy, or the like.

The secondary antiferromagnetic layer 6C is composed of an X"—Mn alloy, where X" is at least one element selected from the group consisting of Ru, Rh, Ir, Pd, and Pt.

In the X"—Mn alloy, if X" is Ru, Ru preferably ranges from 10 to 45 atomic %, if X" is Rh or Ir, Rh or Ir preferably ranges from 10 to 40 atomic %, and if X" is Pd or Pt, Pd or Pt preferably ranges from 10 to 25 atomic %.

While the alloy used for the antiferromagnetic layer 2 has a disordered structure when deposited and the disordered structure is transformed into an ordered structure by heat treatment, with respect to the secondary antiferromagnetic layer 6C, an alloy having the composition described above having a disordered structure when deposited is used.

The reason for using an X"—Mn alloy having the composition described above is that, as disclosed by the present inventor in Japanese Unexamined Patent Publication No. 9-35212 (Japanese Patent Application No. 7-183121), the compositional range described above enables a proper exchange anisotropic magnetic field as well as excellent corrosion resistance.

For example, in the case of an Ru—Mn alloy, more preferably, Ru ranges from 15.5 to 44 atomic %, in the case of an Rh—Mn alloy, more preferably, Rh ranges from 19.2 to 37 atomic %, in the case of an Ir—Mn alloy, more preferably, Ir ranges from 15.2 to 35.5 atomic %, in the case of a Pd—Mn alloy, more preferably, Pd ranges from 12.4 to 22.6 atomic %, and in the case of a Pt—Mn alloy, more preferably, Pt ranges from 10.9 to 21.3 atomic %.

The magnetization direction of the secondary antiferromagnetic layer 6C is set in the X1 direction in FIG. 1, and thus by applying an exchange anisotropic magnetic field to the soft magnetic layer 6B, the magnetization of the free magnetic layer 5 is aligned in a single-domain state in the X1 direction. In order to set the magnetization direction of the secondary antiferromagnetic layer 6C, magnetic deposition is performed in which the secondary antiferromagnetic layer 6C is deposited while applying a magnetic field in the X1 direction (track width Tw direction).

With respect to the magnetoresistive thin-film element GMR1 shown in FIG. 1, a sensing current is applied from the conductive layer 8 to the free magnetic layer 5, the nonmagnetic conductive layer 4, and the pinned magnetic layer 3. When a magnetic field is applied from a recording medium in the Y direction shown in FIG. 1, the magnetization of the free magnetic layer 5 changes from the X1 direction to the Y direction. At this stage, because conduction electrons scatter depending on spins at the interface between the nonmagnetic conductive layer 4 and the free magnetic layer 5, and at the interface between the nonmagnetic conductive layer 4 and the pinned magnetic layer 3, electrical resistance changes, and the fringing magnetic field from the recording medium is detected.

In such a case, although the magnetization direction of the pinned magnetic layer 3 is fixed by the anisotropic magnetic field of the antiferromagnetic layer 2, the magnetization direction of the free magnetic layer 5 can be rotated. Thus, because the magnetization direction of the free magnetic layer 5 is rotated under the influence of the fringing magnetic field from the magnetic recording medium, a change in magnetoresistance occurs. In such a case, in order that the magnetization of the free magnetic layer 5 may be rotated smoothly, preferably, uniaxial anisotropy is imparted to the free magnetic layer 5 in the X1 direction in FIG. 1 and the free magnetic layer 5 is aligned in a single-domain state, that is, a longitudinal bias magnetic field is applied to the free magnetic layer 5. Therefore, with respect to the free magnetic layer 5 to which uniaxial anisotropy is imparted under the influence of the anisotropic magnetic field applied from the secondary antiferromagnetic layer 6C through the soft magnetic layer 6B, a smooth change in resistance without Barkhausen noise is easily obtained.

In the conventional structure provided with hard bias layers, insensitive zones are generated in the ends of a free magnetic layer in the track width region because of the magnetization of the hard bias layers, resulting in a hindrance to narrowing of tracks. In contrast, with respect to the mechanism in which a bias magnetic field is applied using the secondary antiferromagnetic layer 6C and the soft magnetic layer 6B, such insensitive zones are not greatly generated in the free magnetic layer 5, and thus, by employing the structure shown in FIG. 1, it is possible to cope with narrowing of tracks.

In the structure, as disclosed in Japanese Unexamined Patent Publication No. 8-45032 (Japanese Patent Application No. 7-122104), an NiMn alloy which requires heat treatment is used for applying a longitudinal bias magnetic field and an antiferromagnetic layer made of an FeMn alloy is provided for pinning, and since the blocking temperature of the NiMn alloy is in the vicinity of 400° C. and the blocking temperature of the FeMn alloy is as low as 150° C., the magnetization of the FeMn alloy layer for pinning is adversely affected when the NiMn alloy layer for applying the longitudinal bias magnetic field is subjected to heat treatment. In contrast, in accordance with the structure of the present invention, any treatment to the secondary antiferromagnetic layer 6C for applying a longitudinal bias magnetic field does not adversely affect the antiferromagnetic layer 2. Furthermore, although the FeMn alloy has inferior corrosion resistance, the X—Mn-based alloy and Pt—Mn—X'-based alloy used in the present invention have corrosion resistance superior to the FeMn alloy, and therefore, thin-film magnetic heads having excellent environmental resistance can be provided.

Additionally, although the free magnetic layer 5 and the pinned magnetic layer 3 are provided on the upper and lower surfaces of the nonmagnetic conductive layer 4 in the depth direction, respectively, as a single layer, in FIG. 1, they may be provided as plural layers. The mechanism for demonstrating giant magnetoresistance is based on spin-dependent scattering of conduction electrons at the interfaces between the nonmagnetic conductive layer 4 and the pinned magnetic layer 3 and between the nonmagnetic conductive layer 4 and the free magnetic layer 5. Since a Co layer can be specified as an example of a layer which causes large spin-dependent scattering in relation to the nonmagnetic conductive layer 4 made of Cu, when the pinned magnetic layer 3 is formed of a material other than Co, a thin Co layer 3a may be formed on the surface of the pinned magnetic layer 3 at the nonmagnetic conductive layer 4 side as shown by a chained line in FIG. 1, and a thin Co layer 5a may be formed on the surface of the free magnetic layer 5 at the nonmagnetic conductive layer 4 side as shown by a chained line in FIG. 1.

An example of a method of producing a giant magnetoresistive thin-film element GMR1 having the structure described above will be described.

In order to produce a giant magnetoresistive thin-film element GMR1 shown in FIG. 1, a protective layer 162, a lower shielding layer 163, and a lower gap layer 164 are formed on a substrate, and on the lower gap layer 164, an underlying layer 1, an antiferromagnetic layer 2 made of a PtMn alloy, a pinned magnetic layer 3, a nonmagnetic conductive layer 4, a free magnetic layer 5, and a protective layer 7 are deposited in that order by sputtering or the like. Additionally, the protective layer 162, the lower shielding layer 163, and the lower gap layer 164 are required when a thin-film magnetic head having the structure shown in FIGS. 2 to 4 is produced, and therefore, if thin-film magnetic heads having other structures are produced, layers which are required for the individual structures are deposited.

After deposition, the antiferromagnetic layer 2 made of the PtMn alloy has a disordered structure when deposited, and an exchange anisotropic magnetic field in relation to the pinned magnetic layer 3 is not greatly generated, or even if generated, the exchange anisotropic magnetic field is insufficient to pin the magnetization direction of the pinned magnetic layer 3. However, by performing annealing treatment in which the antiferromagnetic layer 2 is heated at a temperature in the range from 200 to 350° C. and then slowly cooled while applying a magnetic field unidirectionally (in the Y direction in FIG. 1, i.e., in the height direction of the element), the antiferromagnetic layer 2 having the disordered structure can be transformed into the antiferromagnetic layer 2 having an ordered structure, and thereby a significantly large exchange anisotropic magnetic field can be generated to strongly pin the magnetization direction of the pinned magnetic layer 3.

Next, the laminated film on the lower gap layer 164 is covered by a resist and ion milling is performed to obtain a laminate S1, which is trapezoidal in section, as shown in FIG. 1. The heat treatment described above may be performed after the laminate S1 is obtained.

After the laminate S1 is produced, on the lower gap layer 164 at both sides of the laminate S1, underlying layers 6A, soft magnetic layers 6B, secondary antiferromagnetic layers 6C, and conductive layers 8 are deposited so as to sandwich the laminate S1. When the secondary antiferromagnetic layers 6C are deposited, by performing magnetic deposition in which the secondary antiferromagnetic layers 6C are deposited while applying a magnetic field in the X1 direction in FIG. 1 (track width Tw direction), the soft magnetic layers 6B can be aligned in a single-domain state in the track width direction due to unidirectional exchange coupling by the secondary antiferromagnetic layers 6C, and thus a longitudinal bias magnetic field can be applied to the free magnetic layer 5.

Additionally, after deposition, the secondary antiferromagnetic layers 6C may be subjected to heat treatment for tempering or relieving stress at a temperature of 250° C. or less. The temperature for this heat treatment is set at a temperature at which the secondary antiferromagnetic layer 6C maintains the disordered structure, namely, at a temperature at which the ordered structure is not brought about by the heat treatment.

In the magnetic deposition, the temperature of the laminate S1 is only slightly raised by after-heat of the deposition unit, or even if the heat treatment is performed, the treating temperature is set lower than the temperature for transforming the antiferromagnetic layer 2 to the ordered structure. Therefore, the anisotropic magnetic field of the antiferromagnetic layer 2, which has pinned the magnetization of the pinned magnetic layer 3, is not affected. Accordingly, while the magnetization direction of the pinned magnetic layer 3 is being pinned, the free magnetic layer 5 can be aligned in a single-domain state in a direction differing from the pinning direction by 90°, and a satisfactory longitudinal bias magnetic field can be applied to the free magnetic layer 5, and thus the structure shown in FIG. 1 can be obtained.

In accordance with the method described above, when the giant magnetoresistive thin-film element GMR1 shown in FIG. 1 is produced, after the magnetization direction of the pinned magnetic layer 3 is pinned, the secondary antiferromagnetic layer 6C can be formed so as not to influence the anisotropic magnetic field of the antiferromagnetic layer 2, which is uniquely advantageous in the present invention, and which cannot be obtained by conventional techniques.

For example, in the conventional structure provided with hard bias layers, insensitive zones are generated in the ends of a free magnetic layer in the track width region because of the magnetization of the hard bias layers. In contrast, with respect to the mechanism described above in which a bias magnetic field is applied using the secondary antiferromagnetic layer 6C and the soft magnetic layer 6B, such insensitive zones are not greatly generated in the free magnetic layer 5, and thus it is possible to cope with narrowing of tracks.

Second Embodiment

Figure 5:
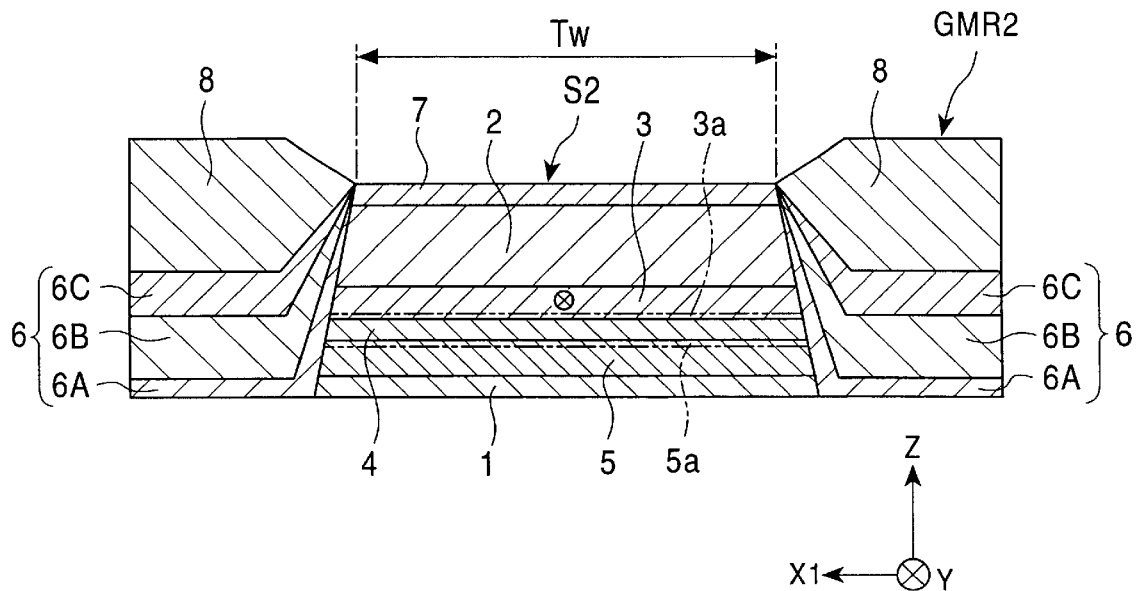
FIG. 5 is a sectional view of a magnetoresistive thin-film element provided on a thin-film magnetic head as a second embodiment of the present invention.

FIG. 5 is a sectional view of a giant magnetoresistive thin-film element provided on a thin-film magnetic head as a second embodiment of the present invention. The thin-film magnetic head in the second embodiment has the same general structure as that of the thin-film magnetic head 150 described with reference to FIGS. 2 to 4, except that a different magnetoresistive thin-film element GMR2 is provided on the GMR head h1. Accordingly, with respect to the structure of the second embodiment, an underlying layer and the magnetoresistive thin-film element GMR2 will be described, and the description of other sections such as a slider and an inductive head (write head) will be omitted.

In the structure of the second embodiment shown in FIG. 5, a substrate is not described. However, since the substrate structure is the same as that in the first embodiment shown in FIG. 1, the description thereof will be omitted.

The magnetoresistive thin-film element GMR2 has a so-called "top-type single spin-valve structure", and includes a laminate S2, that is trapezoidal in section, in which an underlying layer 1, a free magnetic layer 5, a nonmagnetic conductive layer 4, a pinned magnetic layer 3, an antiferromagnetic layer 2, and a protective layer 7 are deposited in that order from the bottom as shown in FIG. 5. On each of the inclined sides of the laminate S2, an underlying layer 6A, a soft magnetic layer 6B, a secondary antiferromagnetic layer 6C, and a conductive layer 8 are deposited. By magnetizing the soft magnetic layer 6B in the X1 direction in FIG. 5, the magnetization of the free magnetic layer 5 is aligned in the X1 direction as shown by an arrow in FIG. 5.

In the second embodiment, constituents of the underlying layer 1, the free magnetic layer 5, the nonmagnetic conductive layer 4, the pinned magnetic layer 3, the protective layer 7, the underlying layer 6A, the soft magnetic layer 6B, and the secondary antiferromagnetic layer 6C are the same as those in the first embodiment. Although a constituent of the antiferromagnetic layer 2 is the same as that in the first embodiment, the preferable compositional ranges are slightly different.

With respect to the binary X—Mn alloy constituting the antiferromagnetic layer 2, the content of the element X is preferably set in a range from 37 to 63 atomic %, and more preferably, in a range of 47 to 57 atomic %. With respect to the ternary Pt—Mn—X' alloy, the Pt content is preferably set in a range from 37 to 63 atomic %, and the content of the element X' is preferably set in a range from 0.2 to 10 atomic %. In the ternary Pt—Mn—X' alloy, the content of Pt+X' is more preferably set in a range from 47 to 57 atomic %.

In the structure of the second embodiment, under the influence of a unidirectional exchange coupling magnetic field caused on the soft magnetic layer 6B by the secondary antiferromagnetic layer 6C, the soft magnetic layer 6B also applies a longitudinal bias magnetic field to the free magnetic layer 5 and aligns the magnetization of the free magnetic layer 5 in the X1 direction in FIG. 5 to align the free magnetic layer 5 in a single-domain state. This embodiment has the same other advantages as those in the first embodiment.

Third Embodiment

Figure 6:
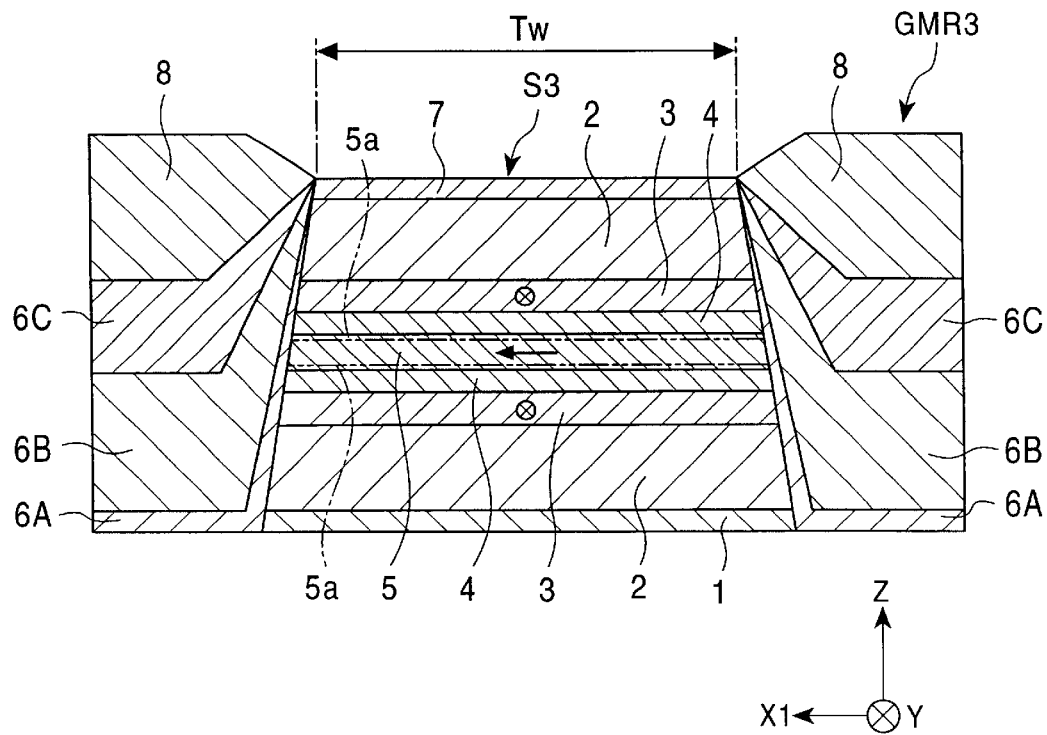
FIG. 6 is a sectional view of a magnetoresistive thin-film element provided on a thin-film magnetic head as a third embodiment of the present invention.

FIG. 6 is a sectional view of a magnetoresistive thin-film element provided on a thin-film magnetic head as a third embodiment of the present invention. The thin-film magnetic head in the third embodiment has the same general structure as that of the thin-film magnetic head 150 described with reference to FIGS. 2 to 4, except that a different magnetoresistive thin-film element is provided on the GMR head h1. Accordingly, with respect to the structure of the third embodiment shown in FIG. 6, the magnetoresistive thin-film element will be described, and the description of other sections such as a slider and an inductive head (write head) will be omitted.

In the structure of the third embodiment shown in FIG. 6, a substrate is omitted. Since the substrate structure is the same as that in the first embodiment shown in FIG. 1, the detailed description thereof will be omitted.

A magnetoresistive thin-film element GMR3 in the third embodiment has a so-called "dual spin-valve structure", and includes a laminate S3, that is trapezoidal in section, in which an underlying layer 1, an antiferromagnetic layer 2, a pinned magnetic layer 3, a nonmagnetic conductive layer 4, and a free magnetic layer 5, and a nonmagnetic conductive layer 4, a pinned magnetic layer 3, an antiferromagnetic layer 2, and a protective layer 7 are deposited in that order from the bottom. On each of the inclined sides of the laminate S3, an underlying layer 6A, a soft magnetic layer 6B, a secondary antiferromagnetic layer 6C, and a conductive layer 8 are deposited. Because of ferromagnetic coupling with the secondary antiferromagnetic layer 6C, the soft magnetic layer 6B applies a longitudinal bias magnetic field to the free magnetic layer 5 in the X1 direction in FIG. 6, and thus the magnetization of the free magnetic layer 5 is aligned in the X1 direction as shown by an arrow in FIG. 6.

In the third embodiment, constituents of the underlying layer 1, the pinned magnetic layer 3, the nonmagnetic conductive layer 4, the free magnetic layer 5, and the protective layer 7 are the same as those in the first embodiment. A constituent of the antiferromagnetic layer 2 is also the same as that in the first embodiment.

In the structure of the third embodiment, under the influence of a unidirectional exchange coupling magnetic field caused by the secondary antiferromagnetic layer 6C, the soft magnetic layer 6B also generates a longitudinal bias magnetic field, and thus the magnetization of the free magnetic layer 5 can be aligned in the X1 direction. This embodiment has the same other advantages as those in the preceding embodiments.

Fourth Embodiment

Figure 7:
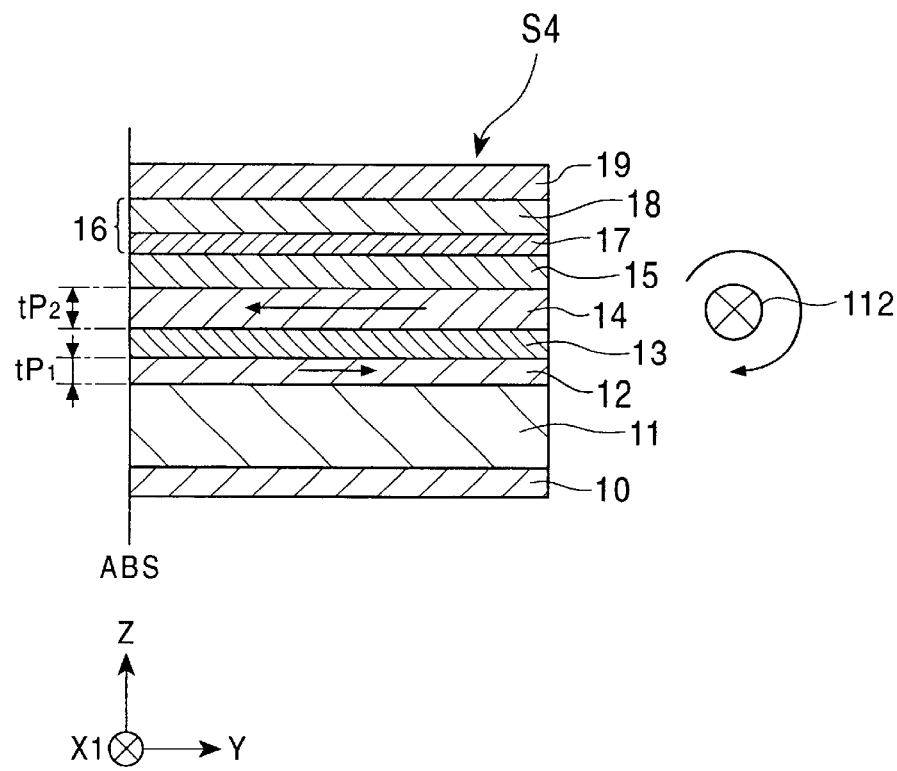
FIG. 7 is a sectional view of a magnetoresistive thin-film element provided on a thin-film magnetic head as a fourth embodiment of the present invention.
Figure 8:
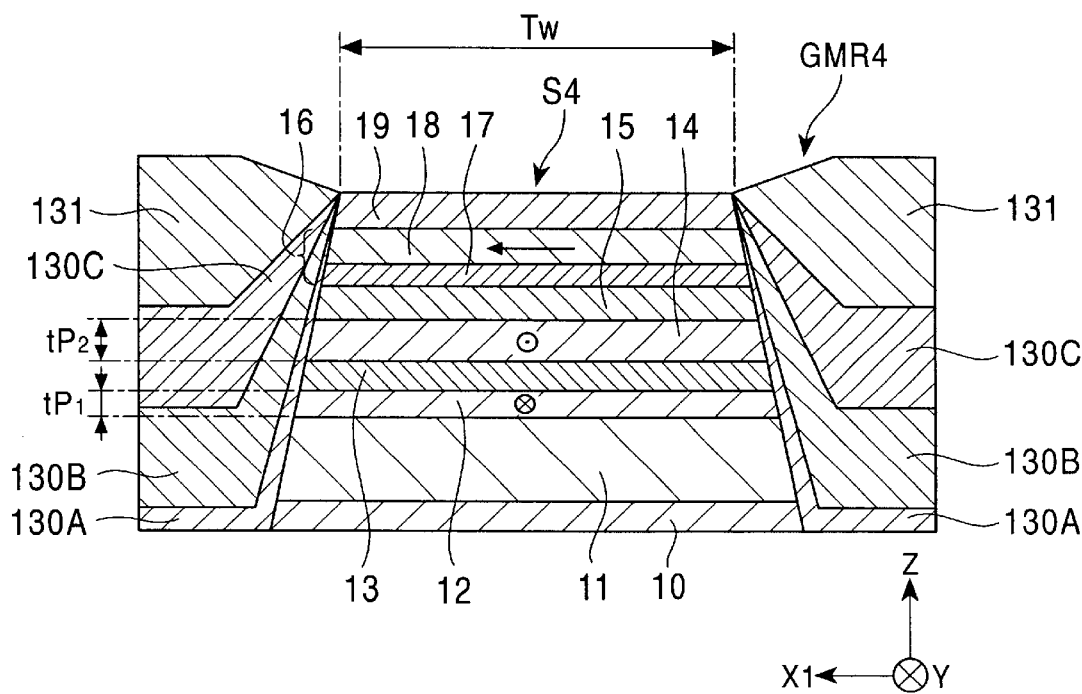
FIG. 8 is a sectional view of the magnetoresistive thin-film element provided on the thin-film magnetic head as the fourth embodiment of the present invention, viewed from another direction.

FIGS. 7 and 8 are schematic diagrams which show a magnetoresistive thin-film element provided on a thin-film magnetic head as a fourth embodiment of the present invention.

The thin-film magnetic head in the fourth embodiment has the same general structure as that of the thin-film magnetic head 150 described with reference to FIGS. 2 to 4, except that a different magnetoresistive thin-film element is provided on the GMR head h1. Accordingly, with respect to the structure of the fourth embodiment, a magnetoresistive thin-film element will be described, and the description of other sections such as a slider and an inductive head (writehead) will be omitted.

Furthermore, in the structure of the fourth embodiment shown in FIG. 7, a substrate is not described. Since the substrate structure is the same as that in the first embodiment shown in FIG. 1, the detailed description thereof will be omitted.

A magnetoresistive thin-film element GMR4 shown in FIG. 7 is a so-called "bottom-type single spin-valve thin-film element" including an antiferromagnetic layer, a pinned magnetic layer, a nonmagnetic conductive layer, and a free magnetic layer, the antiferromagnetic layer being formed on the bottom side. An underlying layer 10 composed of a nonmagnetic material such as Ta is formed in the bottom, and a lower gap layer 164 on the substrate side is provided under the underlying layer 10. In a laminate S4 shown in FIG. 7, an antiferromagnetic layer 11, a first pinned magnetic layer 12, a nonmagnetic intermediate layer 13, a second pinned magnetic layer 14, a nonmagnetic conductive layer 15, a free magnetic layer 16 comprising a layer 17 and layer 18, and a protective layer 19 are deposited in that order on the underlying layer 10.

The first pinned magnetic layer 12 and the second pinned magnetic layer 14 are composed of a Co film, an NiFe alloy, a CoNiFe alloy, a CoFe alloy, or the like.

In the present invention, the antiferromagnetic layer 11 is preferably composed of a PtMn alloy. The PtMn alloy has higher corrosion resistance in comparison with an NiMn alloy or an FeMn alloy, which has been conventionally used as an antiferromagnetic layer, and also has a high blocking temperature and a large exchange coupling magnetic field (exchange anisotropic magnetic field). In the present invention, instead of the PtMn alloy, the antiferromagnetic layer 11 may be composed of an X—Mn alloy, where X is at least one element selected from the group consisting of Pd, Ir, Rh, and Ru, or a Pt—Mn—X' alloy, where X' is at least one element selected from the group consisting of Pd, Ir, Rh, Ru, Au, and Ag. The compositions of the above alloys are the same as those in the X—Mn alloy and the Pt—Mn—X' alloy in the first embodiment.

Arrows in the first pinned magnetic layer 12 and the second pinned magnetic layer 14 shown in FIG. 7 represent the magnitude and direction of the magnetic moments, and the magnitude of a magnetic moment is determined by a value obtained by multiplying a saturation magnetization (Ms) by a film thickness (t).

The first pinned magnetic layer 12 and the second pinned magnetic layer 14 are composed of the same material, for example, a Co film, and a thickness $tP_2$ of the second pinned magnetic layer 14 is larger than a thickness $tP_1$ of the first pinned magnetic layer 12. Thus, the second pinned magnetic layer 14 has a larger magnetic moment than that of the first pinned magnetic layer 12.

In this embodiment, the first pinned magnetic layer 12 and the second pinned magnetic layer 14 must have different magnetic moments. Therefore, the thickness $tP_1$ of the first pinned magnetic layer 12 may be larger than the thickness $tP_2$ of the second pinned magnetic layer 14.

As shown in FIG. 7, the first pinned magnetic layer 12 is magnetized in the Y direction, that is, the direction opposite to a recording medium (the direction of the height of the element or the height direction), and the second pinned magnetic layer 14 is magnetized in the direction antiparallel to the magnetization direction of the first pinned magnetic layer 12 (in the ferrimagnetic state).

The first pinned magnetic layer 12 is formed in contact with the antiferromagnetic layer 11, and by magnetic annealing (heat treatment), an exchange coupling magnetic field (exchange anisotropic magnetic field) is generated at the interface between the first pinned magnetic layer 12 and the antiferromagnetic layer 11. For example, as shown in FIG. 7, the magnetization of the first pinned magnetic layer 12 is fixed in the Y direction. If the magnetization of the first pinned magnetic layer 12 is fixed in the Y direction, the magnetization of the second pinned magnetic layer 14 is fixed in the direction antiparallel to the magnetization direction of the first pinned magnetic layer 12.

As the exchange coupling magnetic field is increased, the magnetizations of the first pinned magnetic layer 12 and the second pinned magnetic layer 14 can be more stably maintained in the antiparallel state, and in particular, in this embodiment, by using the PtMn alloy, which has a high blocking temperature and generates a large exchange coupling magnetic field (exchange anisotropic magnetic field) at the interface with the first pinned magnetic layer 12, as the antiferromagnetic layer 11, the thermal stability in the magnetization states of the first pinned magnetic layer 12 and second pinned magnetic layer 14 can also be maintained.

As described above, in this embodiment, by setting the thickness ratio between the first pinned magnetic layer 12 and the second pinned magnetic layer 14 within a proper range, the exchange coupling magnetic field (Hex) can be increased, and the magnetizations of the first pinned magnetic layer 12 and second pinned magnetic layer 14 can be maintained in the antiparallel state (ferrimagnetic state) which is also thermally stable. Moreover, the rate of resistance change ($\Delta$MR) can be maintained in the same level as that in the conventional element.

Next, the nonmagnetic intermediate layer 13 interposed between the first pinned magnetic layer 12 and the second pinned magnetic layer 14 will be described.

In the present invention, the nonmagnetic intermediate layer 13 is preferably composed of at least one element selected from the group consisting of Ru, Rh, Ir, Cr, Re, and Cu.

As shown in FIG. 7, on the second pinned magnetic layer 14, the nonmagnetic conductive layer 15 composed of Cu or the like is formed, and the free magnetic layer 16 is formed on the nonmagnetic conductive layer 15. The free magnetic layer 16 comprises two layers, and the layer 17 formed in contact with the nonmagnetic conductive layer 15 is composed of a Co film. The layer 18 is composed of an NiFe alloy, a CoFe alloy, a CoNiFe alloy, or the like. The reason for forming the layer 17 made of the Co film in contact with the nonmagnetic conductive layer 15 is that diffusion of metallic elements and the like can be prevented at the interface with the nonmagnetic conductive layer 15 made of Cu and ΔMR can be increased. Additionally, the protective layer 19 is composed of Ta or the like.

At both sides of the magnetoresistive thin-film element GMR4 shown in FIG. 8, underlying layers 130A, which are composed of the same material as that for the underlying layers 6A in the first embodiment, soft magnetic layers 130B, which are composed of the same material as that for the soft magnetic layers 6B in the first embodiment, secondary antiferromagnetic layers 130C, which are composed of the same material as that for the antiferromagnetic layers 6C in the first embodiment, and conductive layers 131 composed of a conductive film of Cu, W, or Cr are formed. The magnetization of the free magnetic layer 16 is aligned in the X1 direction in the drawing by the soft magnetic layers 130B under the influence of the secondary antiferromagnetic layers 130C.

In the structure of the fourth embodiment, under the influence of the longitudinal bias magnetic field generated by the soft magnetic layers 130B, the magnetization of the free magnetic layer 16 is aligned in the X1 direction and uniaxial anisotropy is imparted to align the free magnetic layer 16 in a single-domain state.

With respect to the magnetoresistive thin-film element GMR4 shown in FIGS. 7 and 8, a sensing current is applied from the conductive layer 131 to the free magnetic layer 16, the nonmagnetic conductive layer 15, and the second pinned magnetic layer 14. When a magnetic field is applied from a recording medium in the Y direction shown in FIGS. 7 and 8, the magnetization of the free magnetic layer 16 changes from the X1 direction to the Y direction. At this stage, because conduction electrons scatter depending on spins at the interfaces between the nonmagnetic conductive layer 15 and the free magnetic layer 16 and between the nonmagnetic conductive layer 15 and the second pinned magnetic layer 14, electrical resistance changes, and the fringing magnetic field from the recording medium is detected.

In such a case, since the free magnetic layer 16 is aligned in a single-domain state by the longitudinal bias magnetic field caused by the soft magnetic layers 130B, a smooth change in resistance without Barkhausen noise can be obtained. This embodiment also has the same other advantages as those in the preceding embodiments.

The sensing current also flows at the interface between the first pinned magnetic layer 12 and the nonmagnetic intermediate layer 13. The first pinned magnetic layer 12 is not directly related to ΔMR and functions as an auxiliary to fix the second pinned magnetic layer 14 which is related to ΔMR in a proper direction. Although the flow of the sensing current in the first pinned magnetic layer 12 and the nonmagnetic intermediate layer 13 means a shunt loss (current loss), the amount of the shunt loss is significantly small, and in this embodiment, ΔMR which is the substantially same as that in the conventional structure can be obtained.

Fifth Embodiment

Figure 9:
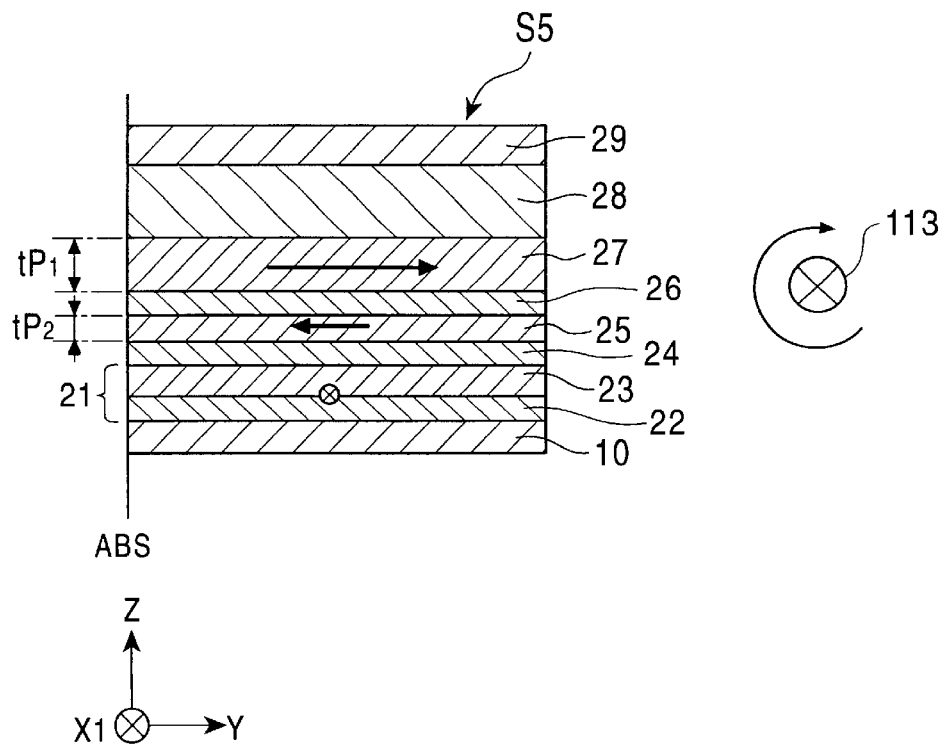
FIG. 9 is a sectional view of a magnetoresistive thin-film element provided on a thin-film magnetic head as a fifth embodiment of the, present invention.
Figure 10:
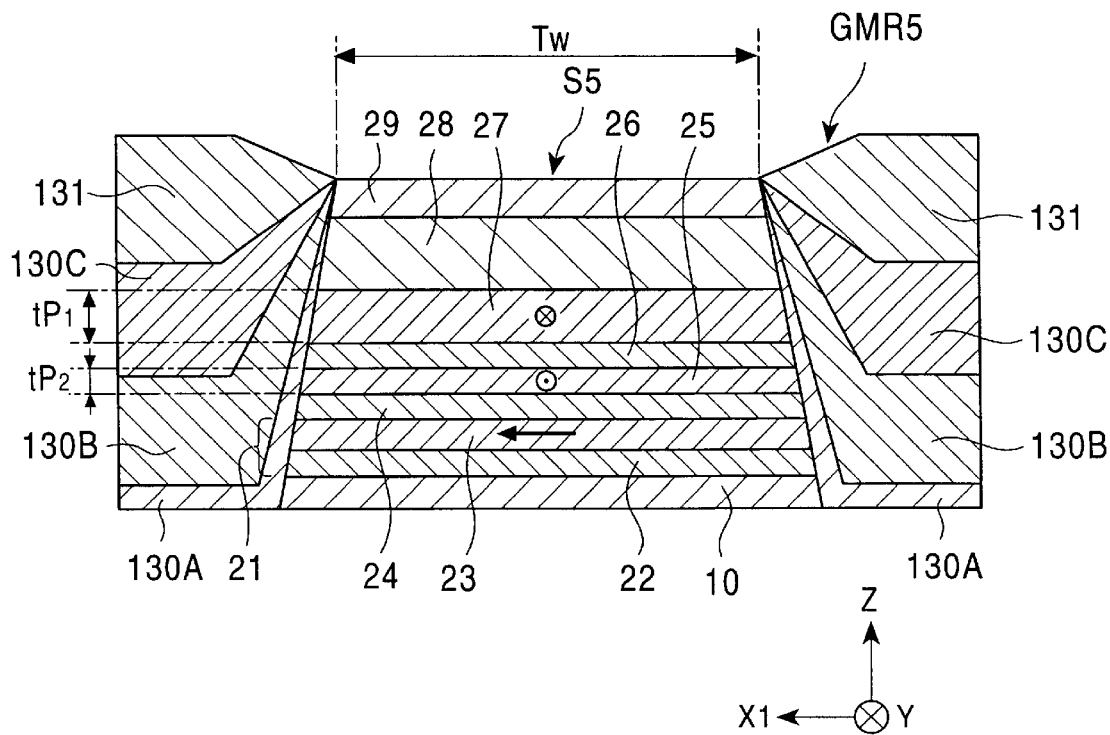
FIG. 10 is a sectional view of the magnetoresistive thin-film element provided on the thin-film magnetic head as the fifth embodiment of the present invention, viewed from another direction.

FIGS. 9 and 10 are sectional views which schematically show the structure of a magnetoresistive thin-film element as a fifth embodiment of the present invention.

A magnetoresistive thin-film element GMR5 shown in FIGS. 9 and 10 is a so-called "top-type single spin-valve thin-film element" having a film structure in a reversed order to that in the bottom-type single spin-valve thin-film element shown in FIG. 7.

The magnetoresistive thin-film element GMR5 includes a laminate S5, in which an underlying layer 10, an NiFe film 22, a Co film 23 (a free magnetic layer 21 comprising the NiFe film 22 and the Co film 23), a nonmagnetic conductive layer 24, a second pinned magnetic layer 25, a nonmagnetic intermediate layer 26, a first pinned magnetic layer 27, an antiferromagnetic layer 28, and a protective layer 29 are deposited in that order.

The antiferromagnetic layer 28 is preferably composed of the same PtMn alloy or X—Mn alloy as that for the antiferromagnetic layer 2 in the second embodiment.

The nonmagnetic intermediate layer 26 interposed between the first pinned magnetic layer 27 and the second pinned magnetic layer 25 is preferably composed of at least one element selected from the group consisting of Ru, Rh, Ir, Cr, Re, and Cu.

In the spin-valve thin-film element shown in FIGS. 9 and 10, a thickness $tP_1$ of the first pinned magnetic layer 27 and a thickness $tP_2$ of the second pinned magnetic layer 25 have different values, and for example, the thickness $tP_1$ of the first pinned magnetic layer 27 is larger than the thickness $tP_2$ of the second pinned magnetic layer 25. The first pinned magnetic layer 27 is magnetized in the Y direction and the second pinned magnetic layer 25 is magnetized in the direction opposite to the Y direction, and thus the magnetizations of the first pinned magnetic layer 27 and the second pinned magnetic layer 25 are in a ferrimagnetic state.

As shown in FIG. 10, at both sides of the laminate S5, in a manner similar to that in the fourth embodiment, underlying layers 130A, soft magnetic layers 130B, secondary antiferromagnetic layers 130C, and conductive layers 131 are formed. The magnetization of the free magnetic layer 21 is aligned in the X1 direction by a longitudinal bias magnetic field applied from the soft magnetic layers 130B.

In the structure of the fifth embodiment, the longitudinal bias magnetic field is also applied to the free magnetic layer 21 from the soft magnetic layers 130B, and the magnetization of the free magnetic layer 21 is aligned in the X1 direction in FIG. 10.

With respect to the magnetoresistive thin-film element GMR5 shown in FIGS. 9 and 10, a sensing current is applied from the conductive layer 131 to the free magnetic layer 21, the nonmagnetic conductive layer 24, and the pinned magnetic layers 25 and 27. When a magnetic field is applied from a recording medium in the Y direction shown in FIG. 10, the magnetization of the free magnetic layer 21 changes from the X1 direction to the Y direction. At this stage, because conduction electrons scatter depending on spins at the interfaces between the nonmagnetic conductive layer 24 and the free magnetic layer 21 and between the nonmagnetic conductive layer 24 and the second pinned magnetic layer 25, electrical resistance changes, and the fringing magnetic field from the recording medium is detected.

In such a case, since the longitudinal magnetic bias magnetic field is applied to the free magnetic layer 21 by induction magnetic anisotropy of the soft magnetic layers 130B to align the free magnetic layer 21 in a single-domain state, a smooth change in resistance without Barkhausen noise can be obtained. This embodiment also has the same other advantages as those in the preceding embodiments.

Sixth Embodiment

Figure 11:
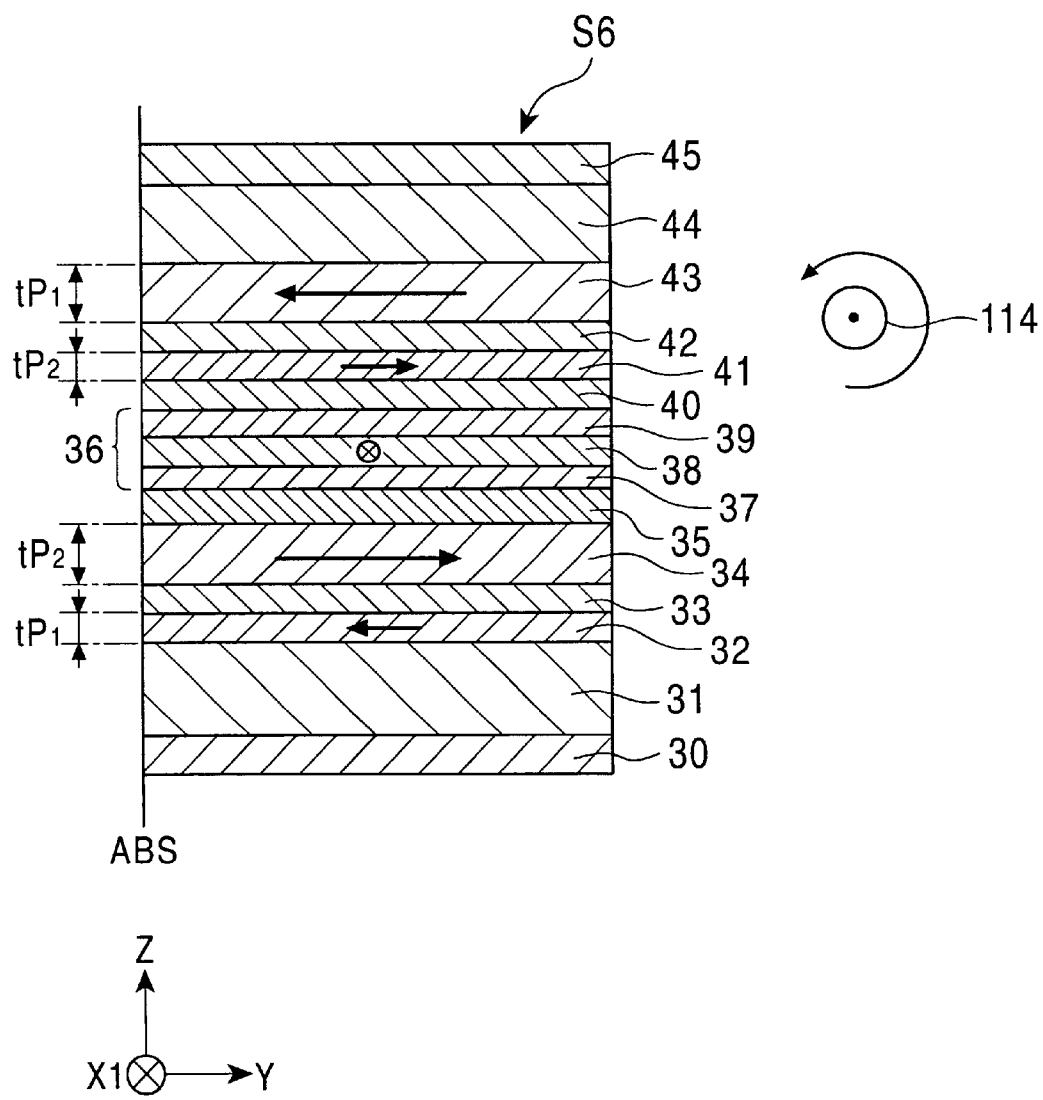
FIG. 11 is a sectional view of a magnetoresistive thin-film element provided on a thin-film magnetic head as a sixth embodiment of the present invention.
Figure 12:
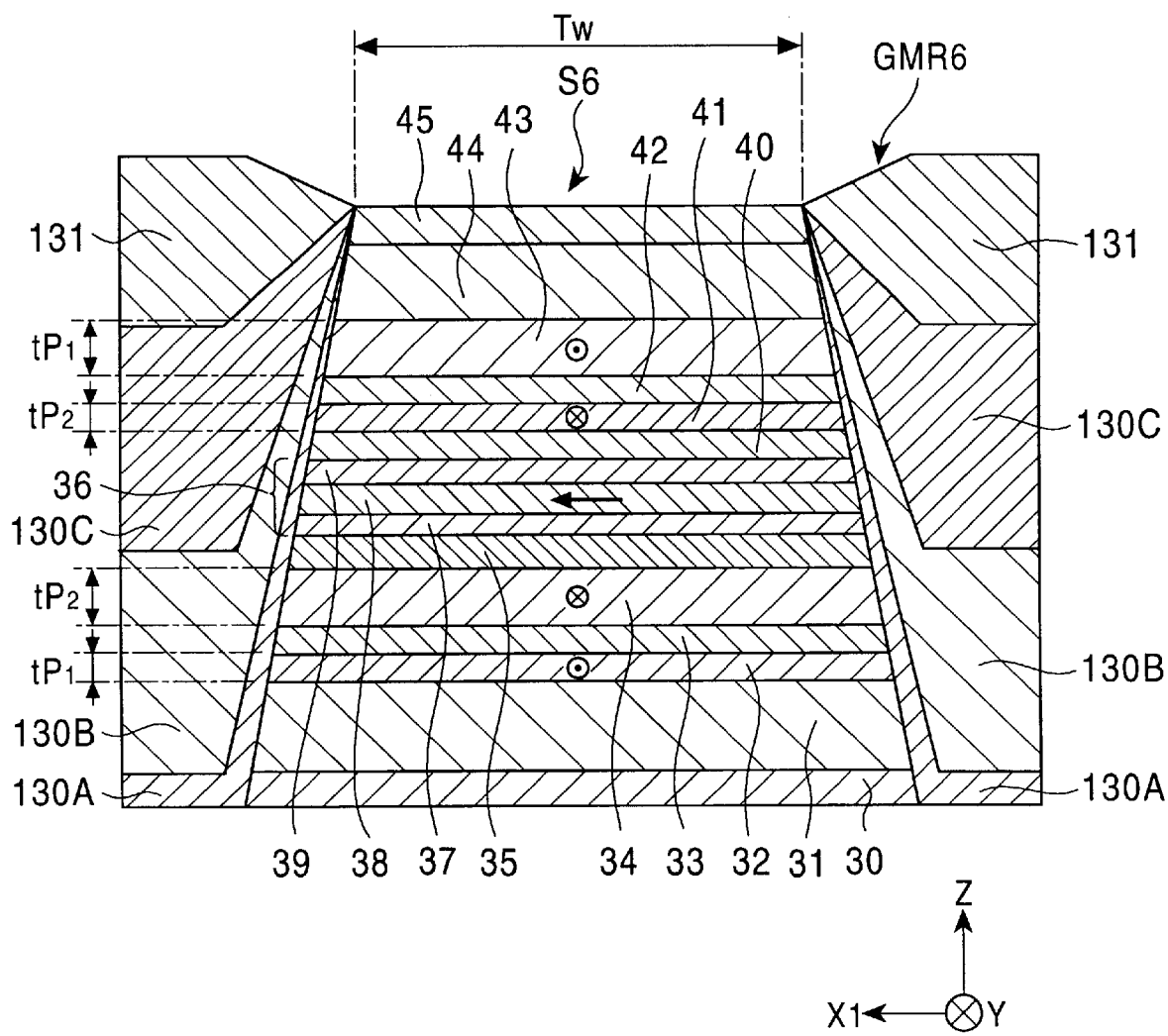
FIG. 12 is a sectional view of the magnetoresistive thin-film element provided on the thin-film magnetic head as the sixth embodiment of the present invention, viewed from another direction.

FIG. 11 is a sectional view which schematically shows the structure of a magnetoresistive thin-film element as a sixth embodiment of the present invention, and FIG. 12 is a sectional view which schematically shows the structure of the magnetoresistive thin-film element shown in FIG. 11, viewed from the surface facing a recording magnetic medium.

A magnetoresistive thin-film element GMR6 is a so-called "dual spin-valve thin-film element". With respect to the dual spin-valve thin-film element, since there are two units of layers, a unit including a free magnetic layer, a nonmagnetic conductive layer, and a pinned magnetic layer, larger ΔMR is expected in comparison with the single spin-valve thin-film element, thus enabling the application in high-density recording.

The magnetoresistive thin-film element GMR6 includes a laminate S6, in which on a lower gap layer 163 at the substrate side, an underlying layer 30, an antiferromagnetic layer 31, a first pinned magnetic layer (lower) 32, a nonmagnetic intermediate layer (lower) 33, a second pinned magnetic layer (lower) 34, a nonmagnetic conductive layer 35, a free magnetic layer 36 (comprising a Co film 37, an NiFe alloy film 38, and a Co film 39), a nonmagnetic conductive layer 40, a second pinned magnetic layer (upper) 41, a nonmagnetic intermediate layer (upper) 42, a first pinned magnetic layer (upper) 43, an antiferromagnetic layer 44, and a protective layer 45 are deposited in that order. As shown in FIG. 12, at both sides of the laminate S6, in a manner similar to that in the preceding embodiment, underlying layers 130A, soft magnetic layers 130B, secondary antiferromagnetic layers 130C, and conductive layers 131 are formed. The magnetization of the free magnetic layer 36 is aligned in the X1 direction by magnetizing the soft magnetic layers 130B in the X1 direction.

The antiferromagnetic layers 31 and 44 are preferably composed of the PtMn alloy or X—Mn alloy described in the preceding embodiment.

The nonmagnetic intermediate layers 33 and 42 interposed between the first pinned magnetic layer (lower) 32 and the second pinned magnetic layer (lower) 34 and between the first pinned magnetic layer (upper) 43 and the second pinned magnetic layer (upper) 41, respectively, are preferably composed of at least one element selected from the group consisting of Ru, Rh, Ir, Cr, Re, and Cu.

As shown in FIGS. 11 and 12, a thickness $tP_1$ of the first pinned magnetic layer (lower) 32 formed below the free magnetic layer 36 is smaller than a thickness $tP_2$ of the second pinned magnetic layer (lower) 34 formed with the nonmagnetic intermediate layer 33 therebetween. On the other hand, a thickness $tP_1$ of the first pinned magnetic layer (upper) 43 formed above the free magnetic layer 36 is larger than a thickness $tP_2$ of the second pinned magnetic layer (upper) 41 formed with the nonmagnetic intermediate layer 42 therebetween. The first pinned magnetic layers (lower and upper) 32 and 43 are magnetized in the direction opposite to the Y direction in the drawing, and the second pinned magnetic layers (lower and upper) 34 and 41 are magnetized in the Y direction.

With respect to the single spin-valve thin-film elements shown in FIGS. 7 to 10, film thicknesses, etc. are adjusted so that $Ms \cdot tP_1$ of the first pinned magnetic layer differ from $Ms \cdot tP_2$ of the second pinned magnetic layer, and the magnetization of the first pinned magnetic layer may be aligned either in the Y direction or in the direction opposite to the Y direction.

However, with respect to the dual spin-valve thin-film element shown in FIGS. 11 and 12, the first pinned magnetic layer (lower) 32 and the first pinned magnetic layer (upper) 43 must be magnetized in the same direction, and therefore, in this embodiment, by adjusting magnetic moments $Ms \cdot tP_1$ of the first pinned magnetic layer (lower) 32 and first pinned magnetic layer (upper) 43 and magnetic moments $Ms \cdot tP_2$ of the second pinned magnetic layer (lower) 34 and second pinned magnetic layer (upper) 41, and by properly adjusting the direction and magnitude of a magnetic field applied during heat treatment, the dual spin-valve thin-film element which functions satisfactorily can be obtained.

The magnetizations of the first pinned magnetic layer (lower) 32 and first pinned magnetic layer (upper) 43 are aligned in the same direction because the magnetizations of the second pinned magnetic layer (lower) 34 and second pinned magnetic layer (upper) 41, which are antiparallel to the magnetizations of the first pinned magnetic layer (lower) 32 and first pinned magnetic layer (upper) 43, must be aligned in the same direction. The reason for this will be described below.

As described above, ΔMR of a spin-valve thin-film element is obtained depending on the relationship between the fixed magnetization of a pinned magnetic layer and the variable magnetization of a free magnetic layer. When a pinned magnetic layer is separated into two layers, namely, a first pinned magnetic layer and a second pinned magnetic layer, as in this embodiment of the present invention, the pinned magnetic layer which is directly related to the ΔMR is the second pinned magnetic layer, and the first pinned magnetic layer functions as an auxiliary to fix the magnetization of the second pinned magnetic layer in a predetermined direction.

Suppose magnetizations of the second pinned magnetic layer (lower) 34 and the second pinned magnetic layer (upper) 41 shown in FIGS. 11 and 12 are fixed in the opposite directions, for example, even if resistance increases in view of the relationship between the fixed magnetization of the second pinned magnetic layer (upper) 41 and the variable magnetization of the free magnetic layer 36, resistance decreases considerably in view of the relationship between the fixed magnetization of the second pinned magnetic layer (lower) 34 and the variable magnetization of the free magnetic layer 36. Consequently, ΔMR of the dual spin-valve thin-film element will become smaller than ΔMR of the single spin-valve element shown in FIGS. 7 and 8.

The problem described above is not limited to the dual spin-valve thin-film element including two separated pinned magnetic layers with the nonmagnetic intermediate layer therebetween as in the case of this embodiment, the same problem occurs in other types of dual spin-valve thin-film elements. In order to demonstrate the characteristics of a dual spin-valve thin-film element in which ΔMR can be increased in comparison with a single spin-valve thin-film element and larger output can be obtained, the magnetizations of pinned magnetic layers formed above and below a free magnetic layer must be fixed in the same direction.

In this embodiment, as shown in FIGS. 11 and 12, with respect to pinned magnetic layers formed below the free magnetic layer 36, $Ms \cdot tP_2$ of the second pinned magnetic layer (lower) 34 is larger than the magnetic moment $Ms \cdot tP_1$ of the first pinned magnetic layer (lower) 32. The magnetization of the pinned magnetic layer (lower) 34 having large $Ms \cdot tP_2$ is fixed in the Y direction. Furthermore, the sum of $Ms \cdot tP_2$ of the second pinned magnetic layer 34 and $Ms \cdot tP_1$ of the first pinned magnetic layer 32, i.e., a so-called resultant magnetic moment, is dominated by the magnetic moment of the second pinned magnetic layer 34 a having large $Ms \cdot tP_2$ and aligned in the Y direction in the drawing.

With respect to pinned magnetic layers formed above the free magnetic layer 36, $Ms \cdot tP_1$ of the first pinned magnetic layer (upper) 43 is larger than $Ms \cdot tP_2$ of the second pinned magnetic layer (upper) 41, and the magnetization of the first pinned magnetic layer (upper) 43 having large $Ms \cdot tP_1$ is fixed in the direction opposite to the Y direction. The sum of $Ms \cdot tP_1$ of the first pinned magnetic layer (upper) 43 and $Ms \cdot tP_2$ of the second pinned magnetic layer (upper) 41, i.e., a so-called resultant magnetic moment, is dominated by $Ms \cdot tP_1$ of the first pinned magnetic layer (upper) 43 and aligned in the direction opposite to the Y direction.

That is, in the dual spin-valve thin-film element shown in FIGS. 11 and 12, the resultant magnetic moments, i.e., sums of $Ms \cdot tP_1$ of the first pinned magnetic layers and $Ms \cdot tP_2$ of the second pinned magnetic layers on the upper and lower sides of the free magnetic layer 36 are aligned in opposite directions. Therefore, the resultant magnetic moment aligned in the Y direction below the free magnetic layer 36 and the resultant magnetic moment aligned in the direction opposite to the Y direction above the free magnetic layer 36 produce a counterclockwise magnetic field as shown in the drawing.

Accordingly, because of the magnetic field produced by the resultant magnetic moments, the magnetizations of the first pinned magnetic layers (lower) 32 and (upper) 43 and the magnetizations of the second pinned magnetic layers (lower) 34 and (upper) 41 can be maintained in a further stabilized ferrimagnetic state.

A sensing current 114 mainly flows in the nonmagnetic conductive layers 35 and 40 having small resistivity and a magnetic field is induced by the sensing current 114 in accordance with the corkscrew rule. By applying the sensing current 114 in the direction shown in FIG. 11, the magnetic field induced by the sensing current at the section including the first pinned magnetic layer (lower) 32, the nonmagnetic intermediate layer (lower) 33, and the second pinned magnetic layer (lower) 34 formed below the free magnetic layer 36 can be set in the same direction as that of the resultant magnetic moment of the first pinned magnetic layer (lower) 32, the nonmagnetic intermediate layer (lower) 33, and the second pinned magnetic layer (lower) 34, and also the magnetic field induced by the sensing current at the section including the first pinned magnetic layer (upper) 43, the nonmagnetic intermediate layer (upper) 42, and the second pinned magnetic layer (upper) 41 formed above the free magnetic layer 36 can be set in the same direction as that of the resultant magnetic moment of the first pinned magnetic layer (upper) 43, the nonmagnetic intermediate layer (upper) 42, and the second pinned magnetic layer (upper) 41.

Although the merit of setting the magnetic field induced by the sensing current in the same direction as that of the resultant magnetic moment will be described below in detail, in short, thermal stability of the pinned magnetic layers can be enhanced, and since a large sensing current can be applied, the regenerated output can be improved. The relationship between the directions of the magnetic field induced by the sensing current and the resultant magnetic moment is obtained because resultant magnetic moments of pinned magnetic layers formed above and below the free magnetic layer 36 produce the counterclockwise magnetic field.

Environmental temperature in a hard disk drive is usually raised to approximately 200° C., and due to the trend toward increasing rotational frequencies and sensing currents, environmental temperature will be further raised. If environmental temperature is raised, although the exchange coupling magnetic field is decreased, in accordance with this embodiment of the present invention, because of the magnetic field produced by the resultant magnetic moments and the magnetic field induced by the sensing current, the magnetizations of the first pinned magnetic layers (lower) 32 and (upper) 43 and the magnetizations of the second pinned magnetic layers (lower) 34 and (upper) 41 can be maintained in a ferrimagnetic state with thermal stability.

The generation of a magnetic field by the resultant magnetic moments and the relationship between the directions of the magnetic field caused by the resultant magnetic moments and the magnetic field induced by the sensing current are features of the present invention, which cannot be obtained in the conventional dual spin-valve thin-film element in which single-layered pinned magnetic layers are formed above and below a free magnetic layer and magnetizations of the pinned magnetic layers are fixed in the same direction.

In this embodiment, $Ms \cdot tP_1$ of the first pinned magnetic layer (lower) 32 formed below the free magnetic layer 36 may be set larger than $Ms \cdot tP_2$ of the second pinned magnetic layer (lower) 34 and $Ms \cdot tP_1$ of the first pinned magnetic layer (upper) 43 formed above the free magnetic layer 36 may be set smaller than $Ms \cdot tP_2$ of the second pinned magnetic layer (upper) 41. In such a case, by applying a magnetic field of 5 kOe or more to the first pinned magnetic layers (lower) 32 and (upper) 43 in a desired direction, i.e., in the Y direction or in the direction opposite to the Y direction, the second pinned magnetic layers (lower) 34 and (upper) 41 can be fixed in the same direction, and also a magnetic field can be produced by a clockwise or counterclockwise resultant magnetic field.

As described above in the spin-valve thin-film element shown in FIGS. 11 and 12, a pinned magnetic layer is separated into two layers, i.e., a first pinned magnetic layer and a second pinned magnetic layer, with a nonmagnetic intermediate layer therebetween, and magnetizations of the two layers are antiparallel to each other (in a ferrimagnetic state) by means of an exchange coupling magnetic field (RKKY interaction) generated between the two pinned magnetic layers, and thus the magnetization state of the pinned magnetic layer can be maintained thermally stable in comparison with conventional elements.

In particular, in this embodiment, by using a PtMn alloy as an antiferromagnetic layer, which has a high blocking temperature and produces a large exchange coupling magnetic field (exchange anisotropic magnetic field) at the interface with the first pinned magnetic layer, the magnetization state of the first and second pinned magnetic layers can be maintained more thermally stable.

Furthermore, in this embodiment, when an antiferromagnetic material such as a PtMn alloy, which requires heat treatment-to produce an exchange coupling magnetic field (exchange anisotropic magnetic field) at the interface with the first pinned magnetic layer, is used as the antiferromagnetic layer, by forming the first pinned magnetic layer and the second pinned magnetic layer so that $Ms \cdot tP_1$ of the first pinned magnetic layer and $Ms \cdot tP_2$ of the second pinned magnetic layer have different values, and by properly adjusting the intensity and direction of an applied magnetic field during heat treatment, the first pinned magnetic layer (and the second pinned magnetic layer) can be magnetized in a desired direction.

In particular, in the dual spin-valve thin-film element shown in FIGS. 11 and 12, by properly adjusting $Ms \cdot tP_1$ of the first pinned magnetic layers (lower) 32 and (upper) 43 and Ms·tP$_2$ of the second pinned magnetic layers (lower) 34 and (upper) 41, and by properly adjusting the intensity and direction of an applied magnetic field during heat treatment, magnetizations of the two second pinned magnetic layers (lower) 34 and (upper) 41 which are related to ΔMR can be aligned in the same direction, and resultant magnetic moments formed above and below the free magnetic layer 36 can be aligned in opposite directions. Therefore, a magnetic field can be formed by the resultant magnetic moments and the relationship between the direction of the magnetic field by the resultant magnetic moments and the direction of a magnetic field induced by a sensing current can be established, thus further improving the thermal stability of the magnetizations of the pinned magnetic layers.

As shown in FIG. 12, at both sides of the laminate S6, in a manner similar to that in the fifth embodiment, underlying layers 130A, soft magnetic layers 130B, secondary antiferromagnetic layers 130C, and conductive layers 131 are formed. The magnetization of the free magnetic layer 36 is aligned in the X1 direction by a longitudinal bias magnetic field applied from the soft magnetic layers 130B.

With respect to the magnetoresistive thin-film element GMR6 shown in FIGS. 11 and 12, a sensing current is applied from the conductive layer to the free magnetic layer 36, the nonmagnetic conductive layers 35 and 40, and second pinned magnetic layers (lower) 34 and (upper) 41. When a magnetic field is applied from a recording medium in the Y direction shown in FIGS. 11 and 12, the magnetization of the free magnetic layer 36 changes from the X1 direction to the Y direction. At this stage, because conduction electrons scatter depending on spins at the interfaces between the nonmagnetic conductive layers 35 and 40 and the free magnetic layer 36 and at the interfaces between the nonmagnetic conductive layers 35 and 40 and the second pinned magnetic layers (lower) 34 and (upper) 41, electrical resistance changes, and the fringing magnetic field from the recording medium is detected.

In such a case, since the free magnetic layer 36 is aligned in a single-domain state by induction magnetic anisotropy of the soft magnetic layers 130B, a smooth change in resistance without Barkhausen noise can be obtained.

Seventh Embodiment

Figure 13:
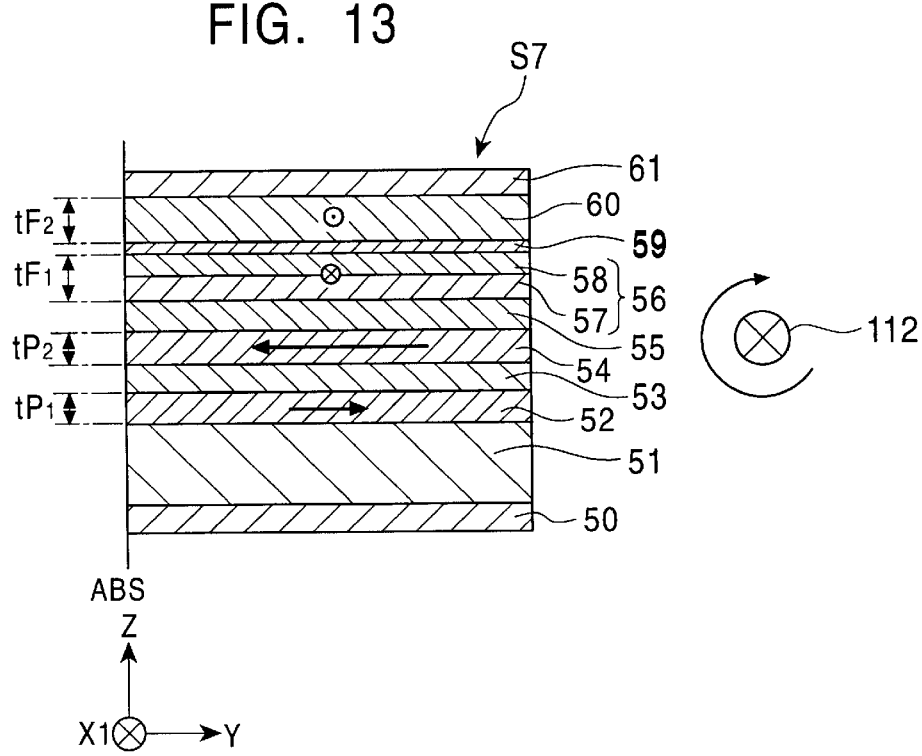
FIG. 13 is a sectional view of a magnetoresistive thin-film element provided on a thin-film magnetic head as a seventh embodiment of the present invention.
Figure 14:
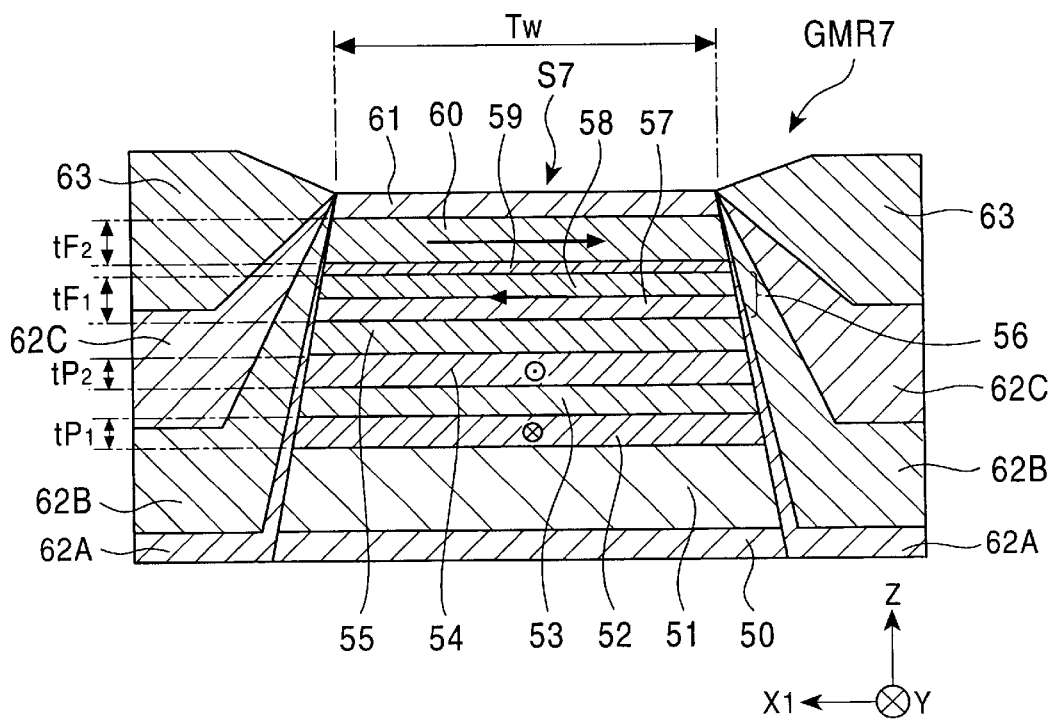
FIG. 14 is a sectional view of the magnetoresistive thin-film element provided on the thin-film magnetic head as the seventh embodiment of the present invention, viewed from another direction.

FIG. 13 is a sectional view which schematically shows the structure of a magnetoresistive thin-film element as a seventh embodiment of the present invention, and FIG. 14 is a sectional view which schematically shows the structure of the magnetoresistive thin-film element shown in FIG. 13, viewed from the surface facing a recording magnetic medium.

A magnetoresistive thin-film element GMR7 in this embodiment, the same as the spin-valve thin-film elements shown in FIGS. 8 to 12, is also provided at a trailing end, etc. of a floating-type slider mounted in a hard disk drive to detect a recording magnetic field from the hard disk or the like. A magnetic recording medium such as a hard disk moves in the Z direction shown in the drawing, and a fringing magnetic field from the magnetic recording medium is applied in the Y direction. In the magnetoresistive thin-film element GMR7 in the seventh embodiment, not only a pinned magnetic layer but also a free magnetic layer is separated into two layers, i.e., a first free magnetic layer and a second free magnetic layer, with a nonmagnetic intermediate layer therebetween.

As shown in FIG. 13, a laminate S7 includes an underlying layer 50, an antiferromagnetic layer 51, a first pinned magnetic layer 52, a nonmagnetic intermediate layer 53, a second pinned magnetic layer 54, a nonmagnetic conductive layer 55, a first free magnetic layer 56, a nonmagnetic intermediate layer 59, a second free magnetic layer 60, and a protective layer 61, which are deposited in that order. The individual layers are composed of the same materials as those for the preceding embodiment.

The first pinned magnetic layer 52 and the second pinned magnetic layer 54 are composed of a Co film, an NiFe alloy, a CoFe alloy, a CoNiFe alloy, or the like. The nonmagnetic intermediate layer 53 is preferably composed of at least one element selected from the group consisting of Ru, Rh, Ir, Cr, Re, and Cu. The nonmagnetic conductive layer 55 is composed of Cu or the like.

The first pinned magnetic layer 52 and the second pinned magnetic layer 54 are magnetized antiparallel to each other in a ferrimagnetic state, and for example, the magnetization of the first pinned magnetic layer 52 is fixed in the Y direction, and the second pinned magnetic layer 54 is fixed in the direction opposite to the Y direction. In order to maintain stability in the ferrimagnetic state, a large exchange coupling magnetic field is required, and in this embodiment, various adjustments as described below are made to obtain a larger exchange coupling magnetic field.

The first free magnetic layer 56 is formed on the nonmagnetic conductive layer 55. As shown in FIG. 13, the first free magnetic layer 56 comprises two layers, and a Co film 57 is formed in contact with the nonmagnetic conductive layer 55. The Co film 57 is formed in contact with the nonmagnetic conductive layer 55 firstly because ΔMR can be increased and secondly because diffusion into the nonmagnetic conductive layer 55 is prevented.

An NiFe alloy film 58 is formed on the Co film 57. The nonmagnetic intermediate layer 59 is formed on the NiFe alloy film 58. The second free magnetic layer 60 is formed on the nonmagnetic intermediate layer 59, and the protective layer 61 composed of Ta or the like is further formed on the second free magnetic layer 60.

The second free magnetic layer 60 is composed of a Co film, an NiFe alloy, a CoFe alloy, a CoNiFe alloy, or the like.

As shown in FIG. 14, the laminate S7 has inclined sides and is trapezoidal in section. At both sides of the laminate S7, in a manner similar to that in the preceding structure, underlying layers 62A, soft magnetic layers 62B, secondary antiferromagnetic layers 62C, and conductive layers 63 are formed. Since the soft magnetic layers 62B are magnetized in the X1 direction, a longitudinal bias magnetic field is applied to the free magnetic layer 60, and the magnetization of the free magnetic layer 60 is aligned in the X1 direction.

The nonmagnetic intermediate layer 59 is disposed between the first free magnetic layer 56 and the second free magnetic layer 60, and magnetizations of the first free magnetic layer 56 and the second free magnetic layer 60 are antiparallel to each other (in a ferrimagnetic state) by means of an exchange coupling magnetic field (RKKY interaction) generated between the first free magnetic layer 56 and the second free magnetic layer 60.

In the spin-valve thin-film element shown in FIG. 14, for example, a thickness tF$_1$ of the first free magnetic layer 56 is smaller than a thickness tF$_2$ of the second free magnetic layer 60.

Ms·tF$_1$ of the first free magnetic layer 56 is set smaller than Ms·tF$_2$ of the second free magnetic layer 60, and when a bias magnetic field is applied in the X1 direction from the soft magnetic layers 62B, the magnetization of the second free magnetic layer 60 having large Ms tF$_2$ is aligned in the X1 direction under the influence of the bias magnetic field, and the magnetization of the first free magnetic layer 56 having small Ms·tF$_1$ is aligned in the direction opposite to the X1 direction by means of an exchange coupling magnetic field (RKKY interaction) with the second free magnetic layer 60.

When an external magnetic field enters in the Y direction, the magnetizations of the first free magnetic layer 56 and the second free magnetic layer 60 are rotated under the influence of the external magnetic field while maintaining the ferrimagnetic state. Electrical resistance changes because of the relationship between the variable magnetization of the first free magnetic layer 56 which is related to ΔMR and the fixed magnetization of the second pinned magnetic layer 54 (for example, aligned in the direction opposite to the Y direction), and the external magnetic field is detected as a change in electrical resistance.

In such a case, since a longitudinal bias magnetic field is applied to the free magnetic layer 60 by means of induction magnetic anisotropy of the soft magnetic layers 62B, a smooth change in resistance without Barkhausen noise can be obtained.

In this embodiment, the nonmagnetic intermediate layer 59 disposed between the first free magnetic layer 56 and the second free magnetic layer 60 is preferably composed of at least one element selected from the group consisting of Ru, Rh, Ir, Cr, Re, and Cu.

Eighth Embodiment

Figure 15:
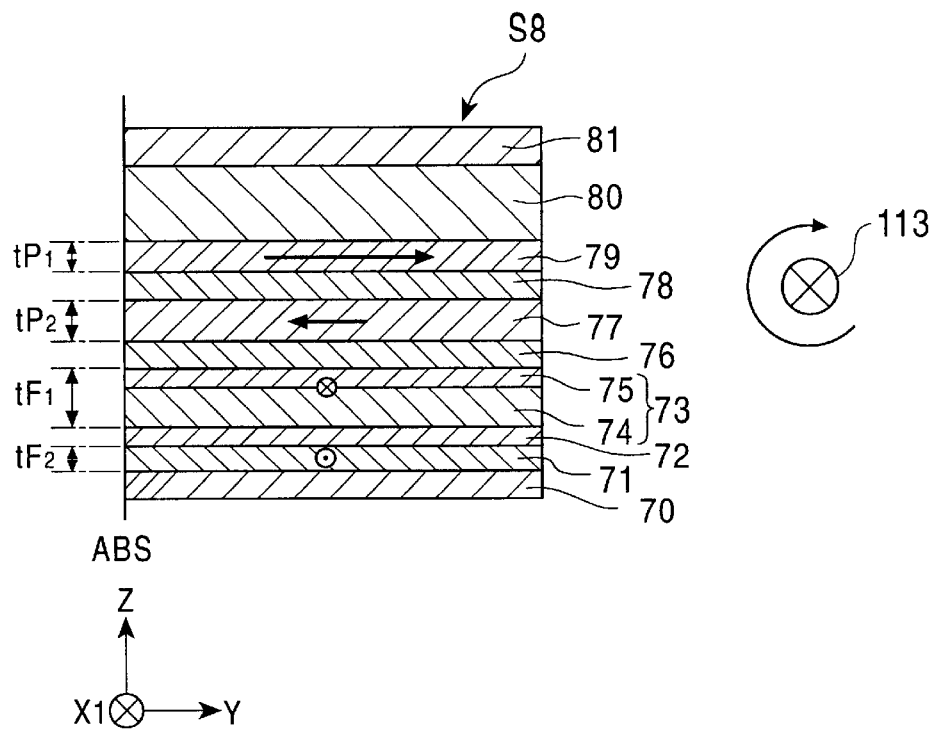
FIG. 15 is a sectional view of a magnetoresistive thin-film element provided on a thin-film magnetic head as an eighth embodiment of the present invention.
Figure 16:
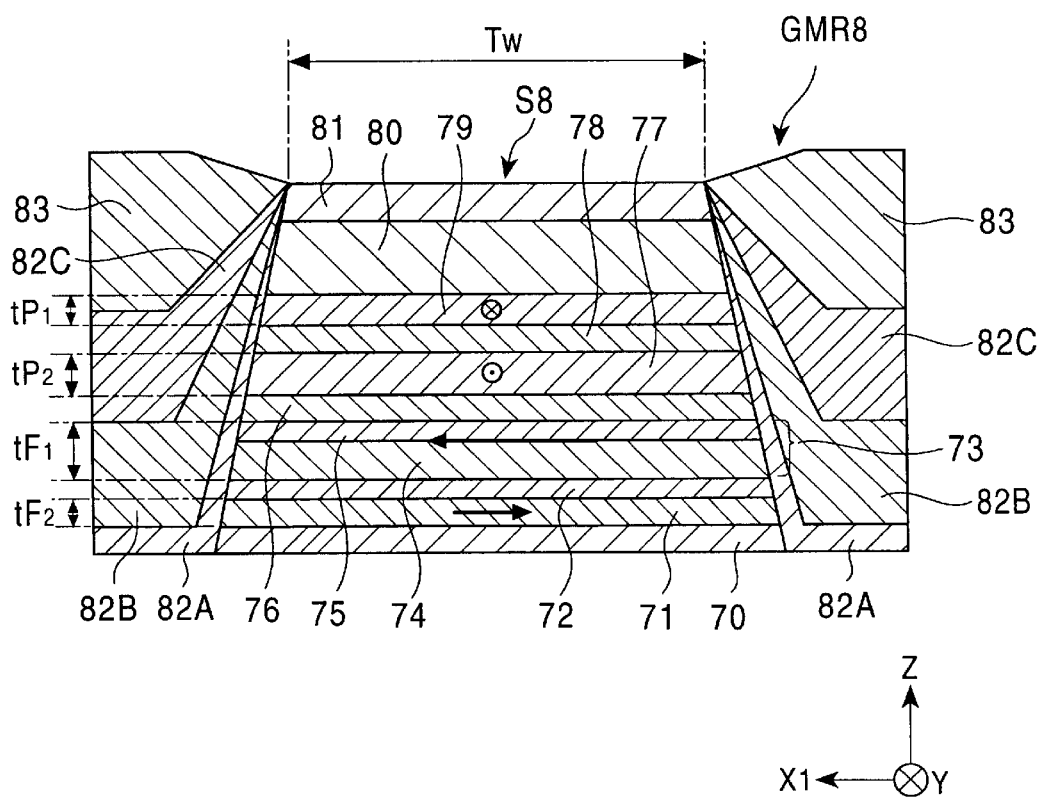
FIG. 16 is a sectional view of the magnetoresistive thin-film element provided on the thin-film magnetic head as the eighth embodiment of the present invention, viewed from another direction.

FIG. 15 is a sectional view which schematically shows the structure of a magnetoresistive thin-film element as an eighth embodiment of the present invention, and FIG. 16 is a sectional view which schematically shows the structure of the magnetoresistive thin-film element shown in FIG. 15, viewed from the surface facing a recording medium.

A magnetoresistive thin-film element GMR8 in this embodiment includes a laminate S8 in which the deposition order is reversed from that in the spin-valve thin-film element shown in FIGS. 13 and 14.

That is, from the bottom, an underlying layer 70, a second free magnetic layer 71, a nonmagnetic intermediate layer 72, a first free magnetic layer 73, a nonmagnetic conductive layer 76, a second pinned magnetic layer 77, a nonmagnetic intermediate layer 78, a first pinned magnetic layer 79, and an antiferromagnetic layer 80, and a protective layer 81 are deposited.

The underlying layer 70 and the protective layer 81 are composed of Ta or the like. The antiferromagnetic layer 80 is preferably composed of a PtMn alloy or an X—Mn alloy described above.

The first pinned magnetic layer 79 and the second pinned magnetic layer 77 are composed of a Co film, an NiFe alloy, a CoFe alloy, a CoNiFe alloy, or the like. The nonmagnetic intermediate layer 78 is preferably composed of at least one element selected from the group consisting of Ru, Rh, Ir, Cr, Re, and Cu. The nonmagnetic conductive layer 76 is composed of Cu or the like.

The spin-valve thin-film element shown in FIG. 15 includes two separate free magnetic layers. The first free magnetic layer 73 is formed in contact with the nonmagnetic conductive layer 76, and another free magnetic layer is the second free magnetic layer 71.

As shown in FIG. 15, the first free magnetic layer 73 comprises two layers, i.e., a layer 75 and a layer 74. The layer 75 formed in contact with the nonmagnetic conductive layer 76 is composed of a Co film, and the layer 74 formed in contact with the nonmagnetic intermediate layer 72 and the second free magnetic layer 71 are composed of, an NiFe alloy, a CoFe alloy, a CoNiFe alloy, or the like.

As shown in FIG. 16, the laminate S8 including the underlying layer 70 to the protective layer 81 has inclined sides and the laminate S8 is trapezoidal in section. At both sides of the laminate S8, in a manner similar to that in the preceding structure, underlying layers 82A, soft magnetic layers 82B, secondary antiferromagnetic layers 82C, and conductive layers 83 are formed. Since the soft magnetic layers 82B are magnetized in the X1 direction, a bias magnetic field is applied to the free magnetic layer 73, and the magnetization of the free magnetic layer 73 is aligned in the X1 direction.

The nonmagnetic intermediate layer 72 is disposed between the first free magnetic layer 73 and the second free magnetic layer 71, and magnetizations of the first free magnetic layer 73 and the second free magnetic layer 71 are antiparallel to each other (in a ferrimagnetic state) by means of an exchange coupling magnetic field (RKKY interaction) generated between the first free magnetic layer 73 and the second free magnetic layer 71. In the spin-valve thin-film element shown in FIG. 16, for example, a thickness tF$_1$ of the first free magnetic layer 73 is larger than a thickness tF$_2$ of the second free magnetic layer 71. Ms·tF$_1$ of the first free magnetic layer 73 is set larger than Ms·tF$_2$ of the second free magnetic layer 71, and when a bias magnetic field is applied in the X1 direction from the soft magnetic layers 82B, the magnetization of the first free magnetic layer 73 having large Ms·tF$_1$ is aligned in the X1 direction under the influence of the bias magnetic field, and the magnetization of the second free magnetic layer 71 having small Ms·tF$_2$ is aligned in the direction opposite to the X1 direction by means of an exchange coupling magnetic field (RKKY interaction) with the first free magnetic layer 73.

The thickness tF$_1$ of the first free magnetic layer 73 may be set smaller than the thickness tF$_2$ of the second free magnetic layer 71, and Ms·tF$_1$ of the first free magnetic layer 73 may be set smaller than Ms·tF$_2$ of the second free magnetic layer 71. However, in such a case, the magnetization of the second free magnetic layer 71 having the large thickness is aligned in the X1 direction, and the magnetization of the first free magnetic layer 73 having the small thickness is aligned in the direction opposite to the X1 direction.

When an external magnetic field enters in the Y direction, the magnetizations of the first free magnetic layer 73 and the second free magnetic layer 71 are rotated under the influence of the external magnetic field while maintaining the ferrimagnetic state. Electrical resistance changes because of the relationship between the magnetization direction of the first free magnetic layer 73 which is related to ΔMR and the fixed magnetization of the second pinned magnetic layer 77, and signals of the external magnetic field are detected.

In such a case, since the free magnetic layer 73 is aligned in a single-domain state by a longitudinal bias magnetic field applied by the soft magnetic layers 82B, a smooth change in resistance without Barkhausen noise can be obtained.

In this embodiment, the nonmagnetic intermediate layer 72 disposed between the first free magnetic layer 73 and the second free magnetic layer 71 is preferably composed of at least one element selected from the group consisting of Ru, Rh, Ir, Cr, Re, and Cu.

By setting the absolute value of the resultant magnetic moment of the first free magnetic layer 73 and the second free magnetic layer 71 larger than the absolute value of the resultant magnetic moment of the first pinned magnetic layer 79 and the second pinned magnetic layer 77, magnetizations of the first free magnetic layer 79 and second free magnetic layer 77 are not easily influenced by the resultant magnetic moment of the first pinned magnetic layer 79 and the second pinned magnetic layer 77, and the magnetizations of the first free magnetic layer 73 and second free magnetic layer 71 are sensitively rotated in relation to an external magnetic field, thus improving an output.

In the eighth embodiment, the magnetization direction of the free magnetic layer 73 is also aligned under the influence of a longitudinal bias magnetic field applied by the soft magnetic layers 82B, and thus a smooth change in resistance without Barkhausen noise can be obtained.

Ninth Embodiment

Figure 17:
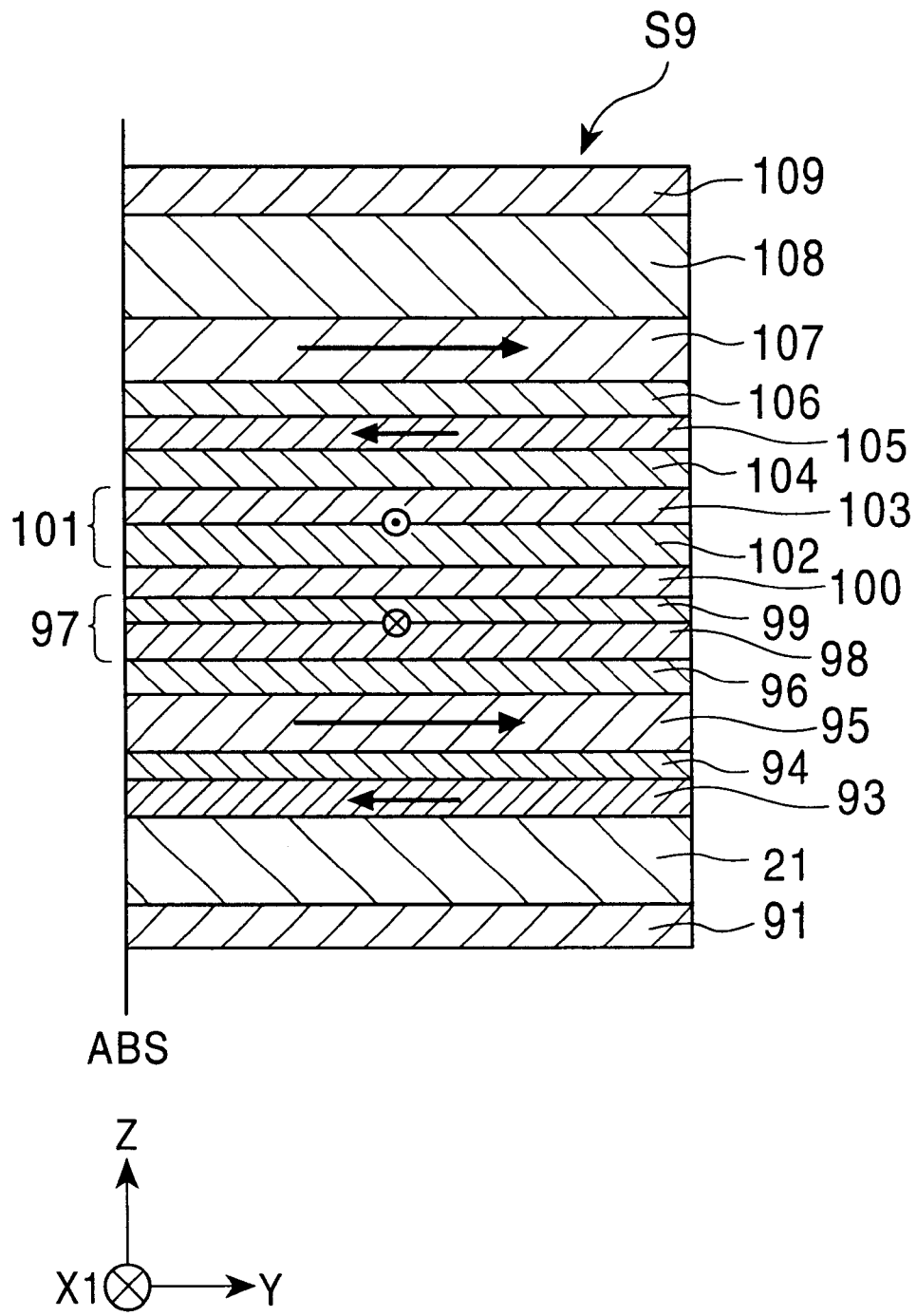
FIG. 17 is a sectional view of a magnetoresistive thin-film element provided on a thin-film magnetic head as a ninth embodiment of the present invention.
Figure 18:
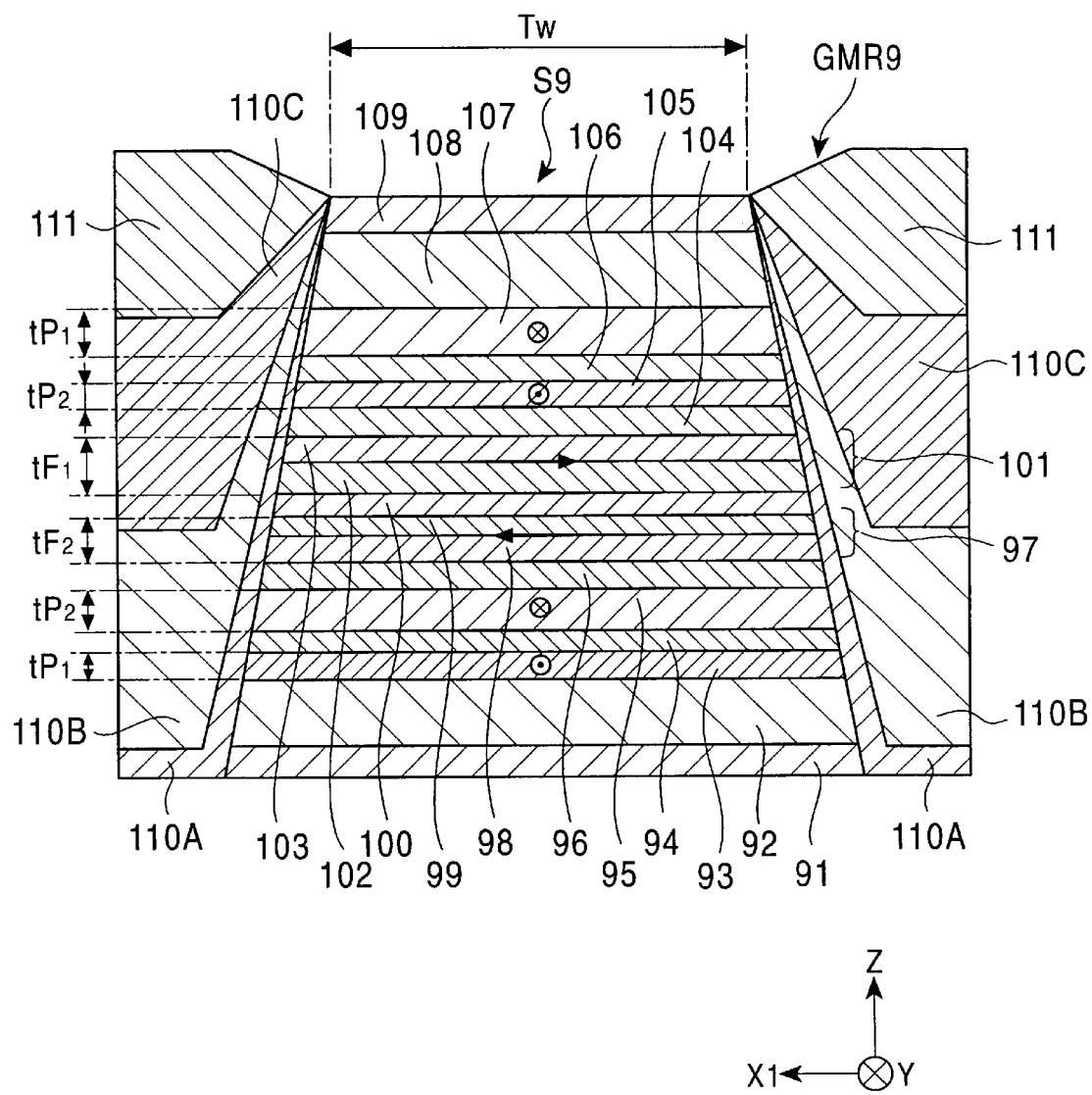
FIG. 18 is a sectional view of the magnetoresistive thin-film element provided on the thin-film magnetic head as the ninth embodiment of the present invention, viewed from another direction.

FIG. 17 is a sectional view which schematically shows the structure of a magnetoresistive thin-film element as a ninth embodiment of the present invention, and FIG. 18 is a sectional view which schematically shows the magnetoresistive thin-film element shown in FIG. 17, viewed from the surface facing a recording medium.

A magnetoresistive thin-film element GMR9 in this embodiment is a dual spin-valve thin-film element, in which a nonmagnetic conductive layer, a pinned magnetic layer, and an antiferromagnetic layer are deposited at each of upper and lower sides of a free magnetic layer, and each of the free magnetic layer and the pinned magnetic layer is separated into two layers with a nonmagnetic intermediate layer therebetween.

The magnetoresistive thin-film element GMR9 includes a laminate S9, in which an underlying layer 91 is formed in the bottom, and an antiferromagnetic layer 92, a first pinned magnetic layer (lower) 93, a nonmagnetic intermediate layer 94 (lower), a second pinned magnetic layer (lower) 95, a nonmagnetic conductive layer 96, a second free magnetic layer 97, a nonmagnetic intermediate layer 100, a first free magnetic layer 101, a nonmagnetic conductive layer 104, a second pinned magnetic layer (upper) 105, a nonmagnetic intermediate layer (upper) 106, a first pinned magnetic layer (upper) 107, an antiferromagnetic layer 108, and a protective layer 109 are deposited on the underlying layer 91. At both sides of the laminate S9, underlying layers 110A, soft magnetic layers 110B, secondary antiferromagnetic layers 110C, and conductive layers 111 are formed.

The antiferromagnetic layers 92 and 108 are preferably composed of a PtMn alloy or an X—Mn alloy, which is also used in the preceding embodiment.

The first pinned magnetic layers (lower) 93 and (upper) 107 and the second pinned magnetic layers (lower) 95 and (upper) 105 are composed of a Co film, an NiFe alloy, a CoFe alloy, a CoNiFe alloy, or the like. The nonmagnetic intermediate layers (lower) 94 and (upper) 106, which are formed between the first pinned magnetic layer (lower) 93 and the second pinned magnetic layer (lower) 95 and between the first pinned magnetic layer (upper) 107 and the second pinned magnetic layer (upper) 105, respectively, and the nonmagnetic intermediate layer 100, which is formed between the first free magnetic layer 101 and the second free magnetic layer 97, are preferably composed of at least one element selected from the group consisting of Ru, Rh, Ir, Cr, Re, and Cu. The nonmagnetic conductive layers 96 and 104 are composed of Cu or the like.

As shown in FIGS. 17 and 18, the first free magnetic layer 101 and the second free magnetic layer 97 comprise two layers. A layer 103 of the first free magnetic layer 101 formed in contact with the nonmagnetic conductive layer 104 and a layer 98 of the second free magnetic layer 97 formed in contact with the nonmagnetic conductive layer 96 are composed of a Co film. A layer 102 of the first free magnetic layer 101 and a layer 99 of the second free magnetic layer 97, which are formed in contact with the nonmagnetic intermediate layer 100, are composed of an NiFe alloy, a CoFe alloy, a CoNiFe alloy, or the like.

By forming the layers 98 and 103 in contact with the nonmagnetic conductive layers 96 and 104, respectively, with the Co film, ΔMR can be increased, and diffusion into the nonmagnetic conductive layers 96 and 104 can be prevented. The underlying layers 110A, the soft magnetic layers 110B, the secondary antiferromagnetic layers 110C, and the conductive layers 111 deposited at both sides of the laminate S9 are composed of the same materials as those used for the underlying layers 82A, the soft magnetic layers 82B, the secondary antiferromagnetic layers 82C, and the conductive layers 83, respectively, in the preceding embodiment.

In this embodiment, as described above, an antiferromagnetic material such as a PtMn alloy is used as the antiferromagnetic layers 92 and 108, which requires heat treatment for producing an exchange coupling magnetic field (exchange anisotropic magnetic field) at interfaces with the first pinned magnetic layers (under) 93 and (upper) 107.

However, since diffusion of metallic elements easily occurs to form a thermal diffusion layer at the interface between the antiferromagnetic layer 92 and the first pinned magnetic layer (lower) 93 which are formed below the free magnetic layer, a magnetic thickness serving as the first pinned magnetic layer (lower) 93 is smaller than an actual thickness $tP_1$. Therefore, in order to substantially equalize an exchange coupling magnetic field produced by the layers above the free magnetic layer and an exchange coupling magnetic field produced by the layers below the free magnetic layer, (a thickness $tP_1$ of the first pinned magnetic layer (lower) 93/a thickness $tP_2$ of the second pinned magnetic layer (lower) 95) formed below the free magnetic layer is preferably larger than (a thickness $tP_1$ of the first pinned magnetic layer (upper) 107/a thickness $tp_2$ of the second pinned magnetic layer (upper) 105). By equalizing the exchange coupling magnetic field produced by the layers above the free magnetic layer and the exchange coupling magnetic field produced by the layers below the free magnetic layer, the exchange magnetic coupling fields are not greatly deteriorated during the fabrication process and reliability of a magnetic head can be improved.

In the dual spin-valve thin-film element shown in FIGS. 17 and 18, the magnetizations of the second pinned magnetic layer (lower) 95 and the second pinned magnetic layer (upper) 105 must be aligned in opposite directions. This is because of the fact that the free magnetic layer is separated into two layers, i.e., the first free magnetic layer 101 and the second free magnetic layer 97, and the magnetization of the first free magnetic layer 101 and the magnetization of the second free magnetic layer 97 are antiparallel to each other.

For example, as shown in FIGS. 17 and 18, when the first free magnetic layer 101 is magnetized in the direction opposite to the X1 direction, the second free magnetic layer 97 is magnetized in the X1 direction by an exchange coupling magnetic field (RKKY interaction) with the first free magnetic layer 101. The magnetizations of the first free magnetic layer 101 and the second free magnetic layer 97 are reversed under the influence of an external magnetic field while maintaining the ferrimagnetic state.

In this embodiment, since the first free magnetic layer 101 and the second free magnetic layer 97 are in the ferrimagnetic state, a magnetic thickness MtF of one of the first free magnetic layer 101 and the second free magnetic layer 97 must be set larger than that of another. In FIG. 18, since the magnetization of the second free magnetic layer 97 is aligned in the X1 direction, if the second free magnetic layer 97 is aligned in a single-domain state in the X1 direction by a longitudinal bias applied from the secondary antiferromagnetic layers 110C and the soft magnetic layers 110B, the magnetization of the first free magnetic layer 101 is aligned in the direction opposite to the X1 direction, thus being magnetically stable, by an exchange coupling magnetic field (RKKY interaction) between the second free magnetic layer 97 and the first free magnetic layer 101.

In the dual spin-valve thin-film element shown in FIGS. 17 and 18, the first free magnetic layer 101 and the second free magnetic layer 97 are both related to ΔMR, and electrical resistance changes depending on the relationship between the variable magnetization of the first free magnetic layer 101 and the second free magnetic layer 97 and the fixed magnetization of the second pinned magnetic layer (lower) 95 and the second pinned magnetic layer (upper) 105. In order to demonstrate the function as a dual spin-valve thin-film element in which larger ΔMR is expected in comparison with a single spin-valve thin-film element, it is necessary to control the magnetization directions of the second pinned magnetic layer (lower) 95 and the second pinned magnetic layer (upper) 105 so that the resistance change between the first free magnetic layer 101 and the second pinned magnetic layer (upper) 105 and the resistance change between the second free magnetic layer 97 and the second pinned magnetic layer (lower) 95 vary in the same manner. That is, when the resistance change between the first free magnetic layer 101 and the second pinned magnetic layer (upper) 105 is maximized, the resistance change between the second free magnetic layer 97 and the second pinned magnetic layer (lower) 95 must also be maximized, and when the resistance change between the first free magnetic layer 101 and the second pinned magnetic layer (upper) 105 is minimized, the resistance change between the second free magnetic layer 97 and the second pinned magnetic layer (lower) 95 must also be minimized.

Accordingly, in the dual spin-valve thin-film element shown in FIGS. 17 and 18, since the first free magnetic layer 101 and the second free magnetic layer 97 are magnetized antiparallel to each other, the second pinned magnetic layer (upper) 105 and the second pinned magnetic layer (lower) 95 must be magnetized in opposite directions.

As described above, by magnetizing the second pinned magnetic layer (lower) 95 and the second pinned magnetic layer (upper) 105 in opposite directions, ΔMR that is substantially the same as that in the conventional dual spin-valve thin-film element can be obtained.

In the ninth embodiment, a longitudinal bias magnetic field is also applied from the soft magnetic layers 110 to the free magnetic layer 97, and the magnetization of the free magnetic layer 97 is easily aligned in the X1 direction. That is, the magnetic anisotropy (anisotropic magnetic field) of the free magnetic layer 97 can be adjusted in a preferable range.

As described above, in the spin-valve thin-film elements shown in FIGS. 13 to 18, not only a pinned magnetic layer but also a free magnetic layer is separated into two layers, i.e., a first free magnetic layer and a second free magnetic layer, with a nonmagnetic intermediate layer therebetween and the magnetizations of the two free magnetic layers are set in an antiparallel state (ferrimagnetic state) by an exchange coupling magnetic field (RKKY interaction) occurring between the two free magnetic layers, and thus the magnetizations of the first free magnetic layer and the second free magnetic layer are reversed sensitively in relation to an external magnetic field.

In the present invention, the exchange coupling magnetic field can be increased by properly adjusting a thickness ratio between a first free magnetic layer and a second free magnetic layer, a thickness of a nonmagnetic intermediate layer disposed between the first free magnetic layer and the second free magnetic layer, a thickness ratio between a first pinned magnetic layer and a second pinned magnetic layer, a thickness of a nonmagnetic intermediate layer disposed between the first pinned magnetic layer and the second pinned magnetic layer, and a thickness of an antiferromagnetic layer, etc. By setting the magnetization state of the first pinned magnetic layer and the second pinned magnetic layer as fixed magnetization and the magnetization state of the first free magnetic layer and the second free magnetic layer as variable magnetization, a ferrimagnetic state which is thermally stable can be maintained, and ΔMR that is substantially the same as that of the conventional element can also be obtained.

In the present invention, by further adjusting the direction of a sensing current, the antiparallel state (ferrimagnetic state) with respect to the first pinned magnetic layer and the second pinned magnetic layer can be maintained more thermally stabilized.

In a spin-valve thin-film element, conductive layers are formed at both sides of a laminate including an antiferromagnetic layer, a pinned magnetic layer, a nonmagnetic conductive layer, and a free magnetic layer, and a sensing current is applied from the conductive layers. The sensing current mainly flows in the nonmagnetic conductive layer having small resistivity, at the interface between the nonmagnetic conductive layer and the pinned magnetic layer, and at the interface between the nonmagnetic conductive layer and the free magnetic layer. In the present invention, the pinned magnetic layer are separated into a first pinned magnetic layer and a second pinned magnetic layer, and the sensing current mainly flows at the interface between the second pinned magnetic layer and the nonmagnetic conductive layer.

When the sensing current is applied, a magnetic field is induced by the sensing current in accordance with the corkscrew rule. In the present invention, the direction for applying the sensing current is adjusted so that the magnetic field induced by the sensing current is aligned in the same direction as that of a resultant magnetic moment obtained by adding a magnetic moment of the first pinned magnetic layer and a magnetic moment of the second pinned magnetic layer.

Magnetic Field Induced by Sensing Current

With respect to structures of the individual embodiments shown in FIGS. 7 to 18, the influence of a magnetic field induced by a sensing current will be described.

In the spin-valve thin-film element shown in FIGS. 7 and 8, the second pinned magnetic layer 14 is formed under the nonmagnetic conductive layer 15. In such a case, the direction of a magnetic field induced by a sensing magnetic current is adjusted in the magnetization direction of a pinned magnetic layer having a larger magnetic moment between the first pinned magnetic layer 12 and the second pinned magnetic layer 14.

As shown in FIG. 7, the magnetic moment of the second pinned magnetic layer 14 is larger than the magnetic moment of the first pinned magnetic layer 12, and the magnetic moment of the second pinned magnetic layer 14 is directed in the direction opposite to the Y direction (leftward in the drawing). Therefore, the resultant magnetic moment corresponding to the sum of the magnetic moment of the first pinned magnetic layer 12 and the magnetic moment of the second pinned magnetic layer 14 is directed in the direction opposite to the Y direction (leftward in the drawing).

As described above, the nonmagnetic conductive layer 15 is formed on the upper side of the second pinned magnetic layer 14 and the first pinned magnetic layer 12. Therefore, the direction for applying a sensing current 112 is adjusted so that a magnetic field induced by the sensing current 112 which mainly flows the nonmagnetic conductive layer 15 is directed leftward in the drawing below the nonmagnetic conductive layer 15. Thereby, the resultant magnetic moment of the first pinned magnetic layer 12 and the second pinned magnetic layer 14 and the magnetic field induced by the sensing current are directed in the same direction.

As shown in FIG. 7, the sensing current 112 is applied in the X1 direction. In accordance with the corkscrew rule, the magnetic field induced by the sensing current is formed clockwise. Therefore, the magnetic field induced by the sensing current in the direction opposite to the Y direction shown in the drawing is applied to layers below the nonmagnetic conductive layer 15. The sensing current reinforces the first resultant magnetic moment, and an exchange coupling magnetic field (RKKY interaction) between the first pinned magnetic layer 12 and the second pinned magnetic layer 14 is amplified, thus enabling the antiparallel state of the magnetizations of the first pinned magnetic layer 12 and the second pinned magnetic layer 14 to be more thermally stabilized.

In particular, it is known that if 1 mA of a sensing current is applied, approximately 30 Oe of a magnetic field is induced by the sensing current, and the temperature of the element is raised by approximately 15° C. Furthermore, the rotational frequency of a recording medium is increased to approximately 1,000 rpm, and because of an increase in the rotational frequency, the temperature of the sliding surface of a slider is increased to approximately 100° C. Accordingly, for example, when 10 mA of a sensing current is applied, the temperature of a spin-valve thin-film element is raised to approximately 250° C. and a magnetic field induced by the sensing current has an intensity of 300 Oe.

When a large sensing current is applied at such a very high environmental temperature, if the direction of the resultant magnetic moment obtained by adding the magnetic moment of the first pinned magnetic layer 12 and the magnetic moment of the second pinned magnetic layer 14 and the direction of the magnetic field induced by the sensing current are in opposite directions, the antiparallel state between the magnetization of the first pinned magnetic layer 12 and the magnetization of the second pinned magnetic layer 14 is easily disturbed.

In order to increase resistance to high environmental temperatures, in addition to the adjustment of the direction of the magnetic field induced by the sensing current, an antiferromagnetic material having a high blocking temperature must be used as the antiferromagnetic layer 11, and thus, in this embodiment, a PtMn alloy having a blocking temperature of approximately 400° C. is used therefor.

Additionally, when the resultant magnetic moment of the magnetic moment of the first pinned magnetic layer 12 and the magnetic moment of the second pinned magnetic layer 14 is aligned rightward (in the Y direction) in FIG. 7, a sensing current is applied in the direction opposite to the X1 direction so that a magnetic field induced by the sensing current is formed counterclockwise.

Next, the direction of a sensing current with respect to the spin-valve thin-film element shown in FIGS. 9 and 10 will be described.

In the structure shown in FIGS. 9 and 10, the second pinned magnetic layer 25 and the first pinned magnetic layer 27 are formed on the upper side of the nonmagnetic conductive layer 24. As shown in FIG. 9, the first pinned magnetic layer 27 has a larger magnetic moment than that of the second pinned magnetic layer 25, and the magnetic moment of the first pinned magnetic layer 27 is directed in the Y direction (rightward in the drawing). Therefore, the resulting magnetic moment obtained by adding the magnetic moment of the first pinned magnetic layer 27 and the magnetic moment of the second pinned magnetic layer 25 is directed rightward (in the Y direction).

As shown in FIG. 9, a sensing current 113 is applied in the X1 direction. In accordance with the corkscrew rule, a magnetic field induced by the sensing current 113 is formed clockwise as shown by an arrow in FIG. 10. Since the second pinned magnetic layer 25 and the first pinned magnetic layer 27 are formed above the nonmagnetic conductive layer 24, a magnetic field induced by the sensing current is applied rightward (in the Y direction) to the second pinned magnetic layer 25 and the first pinned magnetic layer 27, i.e., in the same direction as that of the resultant magnetic moment, and thus the antiparallel state between the magnetization of the first pinned magnetic layer 27 and the magnetization of the second pinned magnetic layer 25 is not easily disturbed.

Additionally, when the resultant magnetic moment is directed leftward (in the direction opposite to the Y direction), the sensing current 113 must be applied in the direction opposite to the X1 direction to produce a magnetic field induced by the sensing current 113 counterclockwise so that the direction of the resultant magnetic moment of the first pinned magnetic layer 27 and the second pinned magnetic layer 25 and the direction of the magnetic field induced by the sensing current are aligned in the same direction.

The spin-valve thin-film element shown in FIGS. 11 and 12 is a dual spin-valve thin-film element in which the first pinned magnetic layer (lower) 32 and the first pinned magnetic layer (upper) 43 as well as the second pinned magnetic layer (lower) 34 and the second pinned magnetic layer (upper) 41 are formed sandwiching the free magnetic layer 36.

In the dual spin-valve thin-film element, the direction and magnitude of the magnetic moment of the first pinned magnetic layers (lower) 32 and (upper) 43 and the direction and magnitude of the magnetic moment of the second pinned magnetic layers (lower) 34 and (upper) 41 must be controlled so that resultant magnetic moments formed on the upper and lower sides of the free magnetic layer 36 are directed in opposite directions.

As shown in FIG. 11, the magnetic moment of the second pinned magnetic layer (lower) 34 formed below the free magnetic layer 36 is larger than the magnetic moment of the first pinned magnetic layer (lower) 32, and the magnetic moment of the second pinned magnetic layer (lower) 34 is directed rightward (in the Y direction). Therefore, the resultant magnetic moment obtained by adding the magnetic moment of the first pinned magnetic layer (lower) 32 and the magnetic moment of the second pinned magnetic layer (lower) 34 is directed rightward (in the Y direction). The magnetic moment of the first pinned magnetic layer (upper) 43 formed above the free magnetic layer 36 is larger than the magnetic moment of the second pinned magnetic layer (upper) 41, and the magnetic moment of the first pinned magnetic layer (upper) 43 is directed leftward (in the direction opposite to the Y direction). Therefore, the resultant magnetic moment obtained by adding the magnetic moment of the first pinned magnetic layer (upper) 43 and the magnetic moment of the second pinned magnetic layer (upper) 41 is directed leftward (in the direction opposite to the Y direction). As described above, in the present invention, resultant magnetic moments formed above and below the free magnetic layer 36 are directed in opposite directions.

In this embodiment, as shown in FIG. 11, a sensing current 114 flows in the direction opposite to the X1 direction (toward the front with respect to the drawing). Thereby, a magnetic field induced by the sensing current 114 is formed counterclockwise as shown by the arrow in FIG. 11. Since the resultant magnetic moment formed below the free magnetic layer 36 is directed rightward (in the Y direction) and the resultant magnetic moment formed above the free magnetic layer 36 is directed leftward (in the direction opposite to the Y direction), the directions of the two resultant magnetic moments are the same as the direction of the magnetic field induced by the sensing current, and the antiparallel state between the magnetization of the first pinned magnetic layer (lower) 32 and the magnetization of the second pinned magnetic layer (lower) 34 formed below the free magnetic layer 36 and the antiparallel state between the first pinned magnetic layer (upper) 43 and the second pinned magnetic layer (upper) 41 formed above the free magnetic layer 36 can be maintained thermally stabilized.

Additionally, when the resultant magnetic moment formed below the free magnetic layer 36 is directed leftward and the resultant magnetic moment formed above the free magnetic layer 36 is directed rightward, the sensing current 114 must be applied in the X1 direction, which is opposite to the direction shown in the drawing, so that the direction of a magnetic field induced by the sensing current and the direction of the resultant magnetic moment are aligned in the same direction.

FIGS. 13 and 14 show a spin-valve thin-film element in which a free magnetic field is separated into two layers, i.e., a first free magnetic layer and a second free magnetic layer, with a nonmagnetic intermediate layer therebetween. With respect to the spin-valve thin-film element as shown in FIG. 13, in which the first pinned magnetic layer 52 and the second pinned magnetic layer 54 are formed below the nonmagnetic conductive layer 55, the direction of a sensing current is controlled in a manner similar to that in the case of the spin-valve thin-film element shown in FIG. 7.

With respect to the spin-valve thin-film element shown in FIG. 15, in which the first pinned magnetic layer 79 and the second pinned magnetic layer 77 are formed above the nonmagnetic conductive layer 76, the direction of a sensing current is controlled in a manner similar to that in the case of the spin-valve thin-film element shown in FIG. 9.

In accordance with the embodiments described above, by directing a magnetic field induced by a sensing current and a resultant magnetic moment obtained by adding the magnetic moment of a first pinned magnetic layer and the magnetic moment of a second pinned magnetic layer in the same direction, an exchange coupling magnetic field (RKKY interaction) between the first pinned magnetic layer and the second pinned magnetic layer is amplified, and thus the antiparallel state (ferrimagnetic state) between the magnetization of the first pinned magnetic layer and the magnetization of the second pinned magnetic layer can be maintained thermally stable.

In particular, in the embodiments, in order to improve thermal stability, an antiferromagnetic material having a high blocking temperature such as a PtMn alloy is used as an antiferromagnetic layer, and thus, even if environmental temperature is raised more largely than usual, the antiparallel state (ferrimagnetic state) between the magnetization of the first pinned magnetic layer and the magnetization of the second pinned magnetic layer is not easily disturbed.

If an amount of a sensing current is increased to increase regenerated output in order to cope with higher recording density, a magnetic field induced by the sensing current is also increased. In the embodiments of the present invention, since the magnetic field induced by the sensing current amplifies an exchange coupling magnetic field between the first pinned magnetic layer and the second pinned magnetic layer, the magnetization state of the first pinned magnetic layer and the second pinned magnetic layer is more stabilized by the increase in the magnetic field induced by the sensing current.

Additionally, the control of the direction of the sensing current is applicable to the case in which whatever antiferromagnetic material is used as an antiferromagnetic layer, and for example, regardless of heat treatment required for producing an exchange coupling magnetic field (exchange anisotropic magnetic field) between the antiferromagnetic layer and a pinned magnetic layer (first pinned magnetic layer).

With respect to single spin-valve thin-film elements in which single-layered pinned magnetic layers are formed as shown in the embodiments in FIGS. 1, 5, and 6, the magnetization of the pinned magnetic layer can be thermally stabilized, of course, by aligning the direction of a magnetic field induced by a sensing current and the magnetization direction of the pinned magnetic layer in the same direction.

EXAMPLE

On a silicon substrate, an alumina layer ($Al_2O_3$ layer) was deposited as an underlying layer at a thickness of 500 Å by sputtering.

On this substrate, an underlying layer composed of Ta was deposited at a thickness of 50 Å by sputtering, and an antiferromagnetic layer composed of a PtMn film at a thickness of 300 Å, a pinned magnetic layer composed of a Co film at a thickness of 25 Å, a nonmagnetic conductive layer composed of a Cu film at a thickness of 25 Å, a free magnetic layer comprising a Co film at a thickness of 10 Å and an NiFe film at a thickness of 50 Å, and a protective layer composed of Ta at a thickness of 50 Å were deposited in that order. A laminate, that is trapezoidal in section, was obtained by ion milling at a width corresponding to a track width.

The structure of the laminate is summarized as follows: (Si/$Al_2O_3$/Ta layer 50 Å/PtMn layer 300 Å/Co layer 25 Å/Cu layer 25 Å/Co layer 10 Å/NiFe layer 50 Å/Ta layer 50 Å)

In order to obtain an exchange coupling between the PtMn antiferromagnetic layer and the pinned magnetic layer in the direction of the height of the element (in the Y direction in FIG. 1), annealing was performed at approximately 240° C. for 4 hours while applying a magnetic field of approximately 1 kOe in the direction of the height of the element. By this treatment, the antiferromagnetic layer was transformed from a disordered structure to an ordered structure, and the magnetization direction of the pinned magnetic layer was pinned by an exchange anisotropic magnetic field.

Next, at both sides of the laminate, underlying layers composed of Ta were formed at a thickness of 50 Å, and soft magnetic layers composed of an NiFe alloy at a thickness of 100 Å, secondary antiferromagnetic layers composed of RuMn at a thickness of 100 Å, and conductive layers composed of Cu at a thickness of 500 Å were deposited thereon to obtain a magnetoresistive thin-film element (bottom-type spin-valve element).

When the secondary antiferromagnetic layers were deposited, annealing was performed at approximately 200° C. while applying a magnetic field of approximately 300 Oe in the track width direction of the laminate, and a longitudinal bias was applied from the secondary antiferromagnetic layers through the soft magnetic layers to the free magnetic layer to obtain the magnetoresistive thin-film element. The intensity of the magnetic field was set at 300 Oe during annealing so that the anisotropic magnetic field of the pinned magnetic layer which had been subjected to annealing in the preceding step was not adversely affected.

Figure 19:
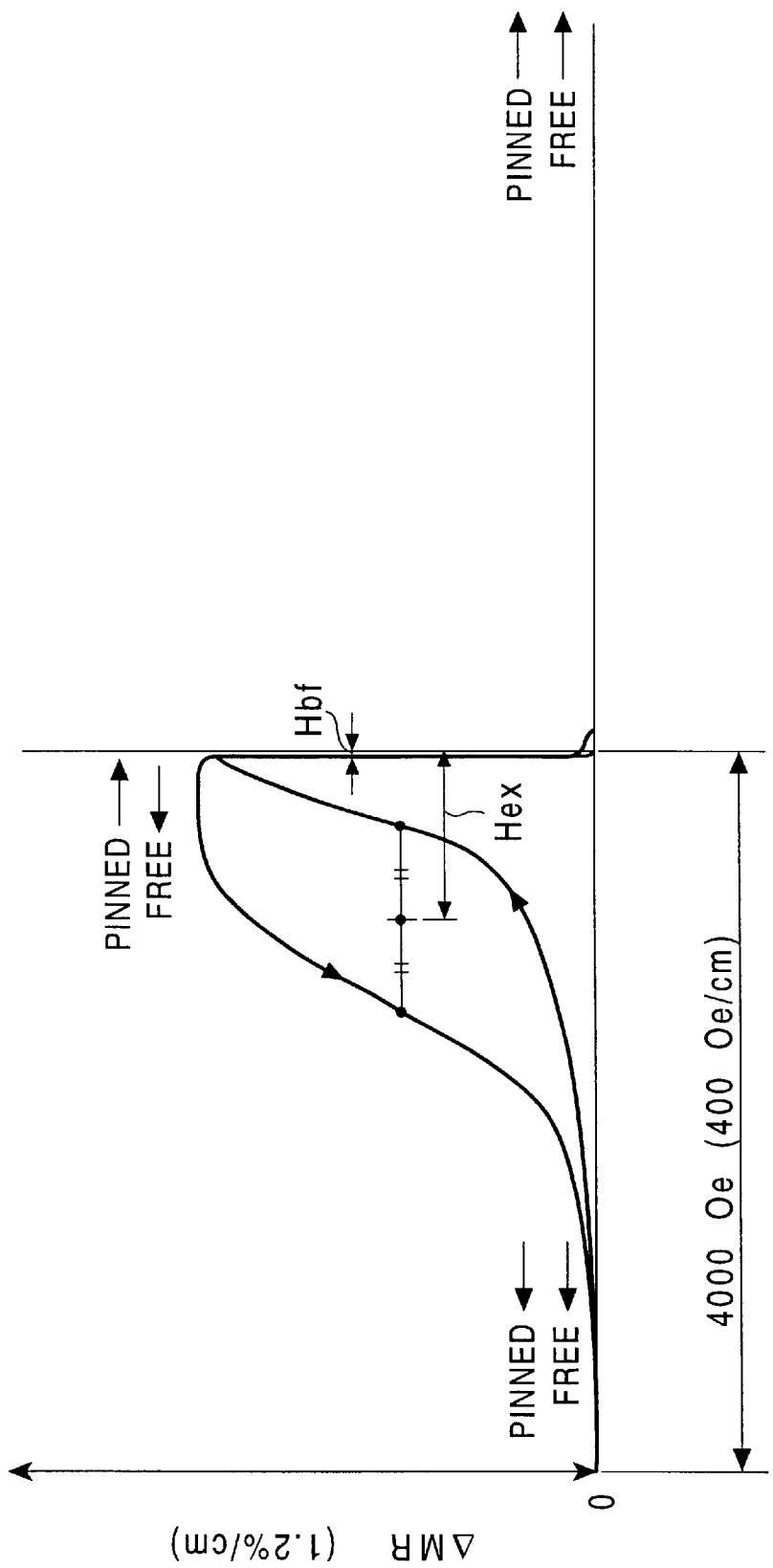
FIG. 19 is a diagram which shows an R-H curve of a giant magnetoresistive thin-film element obtained using the structure in accordance with the present invention.
Figure 20:
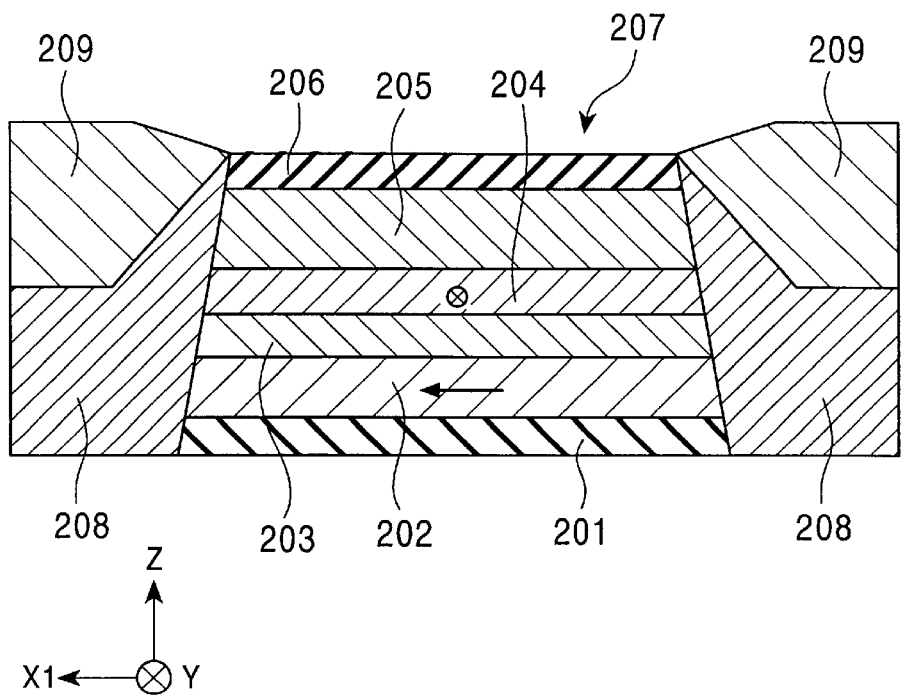
FIG. 20 is a sectional view of a conventional spin-valve type giant magnetoresistive thin-film element.
Figure 21:
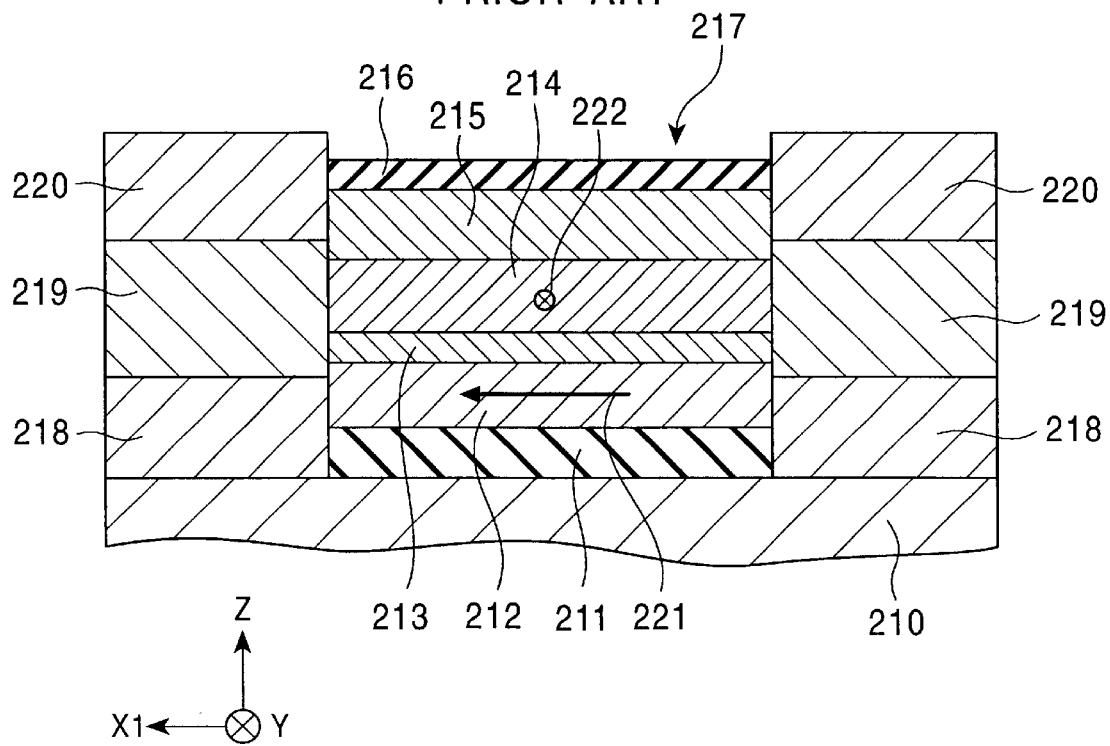
FIG. 21 is a sectional view of another conventional spin-valve type giant magnetoresistive thin-film element.

FIG. 19 is a diagram which shows an R-H curve of a bottom-type magnetoresistive thin-film element having a film structure of (Si substrate/$Al_2O_3$ layer/Ta layer 50 Å/PtMn layer 300 Å/Co layer 25 Å/Cu layer 25 Å/Co layer 10 Å/NiFe layer 50 Å/Ta layer 50 Å) fabricated as described above.

As is obvious from FIG. 19, the magnetoresistive thin-film element exhibits excellent giant magnetoresistance. In the magnetoresistive thin-film element, a value of Hbf (bias magnetic field of a free magnetic layer, i.e., a magnetic filed in which the free magnetic layer starts reversal of magnetization) is 8 Oe, and a value of Hex (exchange anisotropic magnetic field) is 950 Oe.

As described above, when a fringing magnetic field from a recording medium is applied to a giant magnetoresistive thin-film element in the present invention while a sensing current is applied from conductive layers to a free magnetic layer, a nonmagnetic conductive layer, and a pinned magnetic layer, the magnetization of the free magnetic layer varies. At this stage, because conduction electrons scatter depending on spins at the interface between the nonmagnetic conductive layer and the free magnetic layer and at the interface between the nonmagnetic conductive layer and the pinned magnetic layer, electrical resistance changes, and the fringing magnetic field from the recording medium can be detected.

In such a case, although the magnetization direction of the pinned magnetic layer is fixed by an anisotropic magnetic field of the antiferromagnetic layer, the magnetization direction of the free magnetic layer can be rotated. Thus, because the magnetization direction of the free magnetic layer is rotated under the influence of the fringing magnetic field from the magnetic recording medium, a change in magnetoresistance occurs. In such a case, if unidirectional anisotropy is imparted to the free magnetic layer under the influence of the anisotropic magnetic field applied from secondary antiferromagnetic layers through soft magnetic layers, a smooth change in resistance without Barkhausen noise is easily obtained.

In the conventional structure provided with hard bias layers, insensitive zones are generated in the ends of a free magnetic layer in the track width region because of the magnetization of the hard bias layers, resulting in a hindrance to narrowing of tracks. In contrast, with respect to the mechanism in which a bias magnetic field is applied using secondary antiferromagnetic layers and soft magnetic layers, such insensitive zones are not greatly generated in a free magnetic layer, and thus, by employing the structure of the present invention, it is possible to cope with narrowing of tracks.

The present invention is also applicable to either a dual-type giant magnetoresistive thin-film element in which a nonmagnetic conductive layer, a pinned magnetic layer, and antiferromagnetic layer are provided on each side of a free magnetic layer in the depth direction, or a structure in which at least one of a pinned magnetic layer and a free magnetic layer is separated into two layers.

With respect to a structure which has been used conventionally, in which an NiMn alloy which requires heat treatment is used for applying a longitudinal bias magnetic field and an FeMn alloy is used as an antiferromagnetic layer for pinning, since the blocking temperature of the NiMn alloy is in the vicinity of 400° C. and the blocking temperature of the FeMn alloy is as low as 150° C., the magnetization of the FeMn alloy layer for pinning is adversely affected when the NiMn alloy layer for applying the longitudinal bias magnetic field is subjected to heat treatment. In contrast, in accordance with the structure of the present invention, any treatment to secondary antiferromagnetic layers for applying a longitudinal bias magnetic field does not adversely affect an antiferromagnetic layer. That is, since the secondary antiferromagnetic layers as deposited without high-temperature heat treatment generate unidirectional exchange coupling, the antiferromagnetic layer provided on the giant magnetoresistive thin-film element is not adversely affected.

Furthermore, although the FeMn alloy has inferior corrosion resistance, the X—Mn-based alloy and Pt—X—Mn-based alloy used in the present invention have corrosion resistance superior to the FeMn alloy, and therefore, thin-magnetic heads having excellent environmental resistance can be provided.

As described above, in accordance with a method of producing a giant magnetoresistive thin-film element of the present invention, after the magnetization direction of a pinned magnetic layer is pinned by performing heat treatment on an antiferromagnetic layer, a secondary antiferromagnetic layer can be formed so as not to influence the anisotropic magnetic field of the antiferromagnetic layer, which is uniquely advantageous in the present invention, and which cannot be obtained by conventional techniques.

Accordingly, even in the case of producing a structure including a laminate including an antiferromagnetic layer, a pinned magnetic layer, a nonmagnetic conductive layer, and a free magnetic layer, in which at both sides of the laminate, soft magnetic layers and secondary antiferromagnetic layers for applying longitudinal biasing are provided, a longitudinal bias magnetic field can be securely applied to the free magnetic layer by the secondary antiferromagnetic layers and the soft magnetic layers without adversely affecting unidirectional exchange coupling of the antiferromagnetic layer and the pinned magnetic layer only by depositing the soft magnetic layers and the secondary antiferromagnetic layers after heat treatment for obtaining unidirectional exchange coupling between the antiferromagnetic layer and the pinned magnetic layer.

Furthermore, in the conventional structure provided with hard bias layers, insensitive zones are generated in the ends of a free magnetic layer in the track width region because of the magnetization of the hard bias layers, resulting in a hindrance to narrowing of tracks. In contrast, with respect to the mechanism in which a bias magnetic field is applied using secondary antiferromagnetic layers and soft magnetic layers obtained by the production method of the present invention, such insensitive zones are not generated, and thus, giant magnetoresistive thin-film elements which can easily cope with narrowing of tracks can be obtained.

What is claimed is:

1. A thin-film magnetic head comprising a magnetoresistive thin-film element for reading magnetic data, comprising:

a laminate comprising an antiferromagnetic layer, a pinned magnetic layer formed in contact with the antiferromagnetic layer, the magnetization direction of the pinned magnetic layer being fixed in a predetermined direction by an exchange coupling magnetic field caused by the antiferromagnetic layer, and a free magnetic layer formed on the pinned magnetic layer with a nonmagnetic conductive layer therebetween, the magnetization of the free magnetic layer being aligned in the direction perpendicular to the magnetization direction of the pinned magnetic layer;

wherein the magnetoresistive thin-film element comprises a dual-type structure, wherein the nonmagnetic conductive layer, the pinned magnetic layer, and the antiferromagnetic layer reside on each side of the free magnetic layer in the depth direction, wherein each of the pinned magnetic layers is separated into two layers by a nonmagnetic interlayer, and wherein the secondary magnetization directions of the two layers are antiparallel, resulting in a ferrimagnetic state, and wherein a direction of a resultant magnetic moment of the pinned magnetic layers on each side of the free magnetic layer face in opposite directions;

soft magnetic layers at both sides of the laminate;

secondary antiferromagnetic layers in contact with the soft magnetic layers for generating a unidirectional exchange coupling in the soft magnetic layers and applying a bias magnetic field to the free magnetic layer; and conductive layers in contact with the secondary antiferromagnetic layers.

2. A thin-film magnetic head comprising a magnetoresistive thin-film element according to claim 1, wherein the antiferromagnetic layer generates the unidirectional exchange coupling by transformation of a disordered structure into an ordered structure by heat treatment after deposition.

3. A thin-film magnetic head comprising a magnetoresistive thin-film element according to claim 1, wherein the antiferromagnetic layer comprises one of an X—Mn alloy and a Pt—Mn—X' alloy, where X is an element selected from the group consisting of Pt, Pd, Ir, Rh, and Ru, and X' is at least one element selected from the group consisting of Pd, Ir, Rh, Ru, Au, Ag, Cr, and Ni.

4. A thin-film magnetic head comprising a magnetoresistive thin-film element according to claim 1, wherein the secondary antiferromagnetic layer comprises an X"—Mn alloy, where X" is at least one element selected from the group consisting of Ru, Rh, Ir, Pd, and Pt.

5. A thin-film magnetic head comprising a magnetoresistive thin-film element according to claim 1, wherein an underlying layer composed of a nonmagnetic conductor is formed between the laminate and the soft magnetic layers.

6. A thin-film magnetic head comprising a magnetoresistive thin-film element according to claim 1, wherein a magnetic field induced by a sensing current supplied to the magnetoresistive thin-film element is applied to each of the pinned magnetic layers formed above and below the free magnetic layer in the same direction has that of the resultant magnetic moment of the separated layers in each of the pinned magnetic layers formed above and below the free magnetic layer.

* * * * *